United States Patent [19]
Dube

[11] Patent Number: 5,923,785
[45] Date of Patent: Jul. 13, 1999

[54] SYSTEM AND METHOD FOR COMPRESSING DATA

[75] Inventor: Simant Dube, Alpharetta, Ga.

[73] Assignee: Interated Systems, Inc., Atlanta, Ga.

[21] Appl. No.: 08/829,154

[22] Filed: Mar. 31, 1997

[51] Int. Cl.[6] ................................................. G06K 9/00
[52] U.S. Cl. ................................... 382/240; 382/239
[58] Field of Search ................................ 382/238, 236, 382/239, 240, 248, 263, 274, 232, 233, 234, 235, 244, 245, 246, 250, 252, 251, 253; 348/398, 408, 384; 358/430, 426, 432

[56] References Cited

U.S. PATENT DOCUMENTS

| | | | |
|---|---|---|---|
| 5,315,670 | 5/1994 | Shapiro | 382/56 |
| 5,321,776 | 6/1994 | Shapiro | 382/56 |
| 5,412,741 | 5/1995 | Shapiro | 382/232 |
| 5,563,960 | 10/1996 | Shapiro | 382/239 |
| 5,740,277 | 4/1998 | Katto | 382/240 |
| 5,764,805 | 6/1998 | Martucci et al. | 382/238 |

FOREIGN PATENT DOCUMENTS 2293733  4/1996  United Kingdom ............ H03M 7/30

OTHER PUBLICATIONS

"An Embedded Hierarchical Image Coder Using Zerotress of Wavelet Coefficients"; Jerome M. Shapiro; IEEE; Jan. 1993 pp. 214–223, (No Place of Publication).
"A New Fast and Efficient Image Codec Based on Set Partitioning in Hierarchical Trees"; Amir Said and William A. Pearlman; *IEEE Transactions on Circuits and Systems for Video Technology*; May 1993–pp. 1–16.
"Embedded Image Coding Using Zerotrees of Wavelet Coefficients"; James M. Shapiro; *IEEE Transactions on Signal Processing*, vol. 41, No. 12, Dec. 1993–pp. 3445–3462.

*Primary Examiner*—Jose L. Couso
*Assistant Examiner*—Bijan Tadayon
*Attorney, Agent, or Firm*—Morrin, Manning & Martin, L.L.P.

[57] ABSTRACT

A method codes a hierarchical subband system of coefficients of a wavelet transform that is representative of an image. One step of this method includes receiving the coefficients of a wavelet transform. A second step includes selecting a first plurality of thresholds ranges. A third step includes comparing the coefficients of a tree structure of coefficients against the plurality of threshold ranges during a first single traversal of the tree structure. A fourth step includes coding the coefficients of the tree structure with symbols based on whether the coefficients are or are not within at least one of the plurality of threshold ranges. A method may include defining a set of symbols for coding a hierarchical subband system of coefficients of a wavelet transform that is representative of an image. This method includes defining a first set of significance symbols that are representative of the significance of a coefficient with respect to a selected and defining a first set of tree structure traversal symbols that indicate the path in which the tree structure should be traversed and the tree structure traversal symbols being operative for combining with selected ones of the significance symbols.

10 Claims, 20 Drawing Sheets

TREE TRAVERSAL ORDER

1ST ITERATION (52q) MSB [1 1 1] 0 0 0 1 1 0 1   BINARY REPRESENTATION
      9 8 7 6 5 4 3 2 1 0   BIT PLANES ($K^{++}$ BITS)
      512    32    4   THRESHOLD VALUES ($2^K$)

(54w) MSB [1 1 0] 1 1 1 0 0 1 0   BINARY REPRESENTATION
      9 8 7 6 5 4 3 2 1 0   BIT PLANES ($K^{++}$ BITS)
      256    16    2   THRESHOLD VALUES ($2^K$)

700

| SIGNIFICANCE SYMBOL | THRESHOLD | BIT PLANE REPRESENTATION |
|---|---|---|
| S2 | $T < x < 2T$ | $K+1^{+h} = 0$ & $K^{+h} = 1$ |
| S1 | $2T < x < 4T$ | $K+1^{+h} = 1$ |

SYSTEM AND METHOD FOR COMPRESSING DATA

FIELD OF THE INVENTION

The present invention relates to data compression techniques and particularly relates to image compression using wavelet transforms.

BACKGROUND OF THE INVENTION

Many types of data compression systems have been developed for use in various systems. Generally, data compression systems eliminate or reduce redundancies in the data of a file. Data compression systems are useful to represent information as accurately as possible with a minimum number of bits and thus minimize the amount of data which must be stored or transmitted in an information storage or transmission system. One way of doing this is to remove redundant information from the original data. A well-known compression technique is often referred to as zerotree compression.

In zerotree compression, a signal compression system applies a hierarchical subband decomposition, or wavelet transform, followed by a iterative successive approximation entropy-coded quantizer that incorporates zerotrees as discussed below. Wavelet transforms are used for low bit rate image compression because a wavelet transform leads to a hierarchical multi-scale representation of the source image. A significance map codes whether a coefficient in a discrete wavelet transform has a zero or nonzero quantized value. Typically, a large fraction of the bit budget for a computer system must be spent on encoding the significance map. Thus, a significant improvement in encoding the significance map translates into a significant improvement in the compression of information preparatory to storage or transmission.

One method of improving the encoding of a significance map is to define a data structure called a zerotree as known in the art. In zerotree encoding, a wavelet coefficient is said to be insignificant with respect to a given threshold T if the coefficient has a magnitude less than T. A wavelet coefficient that has a magnitude greater than or equal to T is said to be significant. Zerotree compression is based on the hypothesis that if a wavelet coefficient identified at a coarse frequency scale is insignificant with respect to a given threshold T, then all wavelet coefficients of the same orientation in the same spatial location at finer scales of the hierarchical subband decomposition are likely to be insignificant with respect to T. If this hypothesis is met, the identified wavelet coefficient is considered a zerotree root (zerotree).

More specifically, in a hierarchical subband system, with the exception of the highest frequency subbands, every coefficient at a given scale can be related to a set of coefficients at the next finer scale of similar orientation. The coefficient at the given scale is called the parent node, and all coefficients corresponding to the same spatial or temporal location at the next finer scale of similar orientation are called child nodes. For a given parent node, the set of all coefficients at all finer scales of similar orientation corresponding to the same location are called descendants. Similarly, for a given child node, the set of coefficients at all coarser scales of similar orientation corresponding to the same location are called ancestors. With the exception of the lowest frequency subband, all parent nodes have four child nodes. In the lowest frequency subband, the parent-child relationship is defined such that each parent node has three child nodes.

The scanning of the coefficients is performed such that no child node is scanned before any of its parent nodes. Given a threshold level to determine whether or not a coefficient is significant, a node is defined as a ZEROTREE ROOT if (1) the coefficient has an insignificant magnitude, (2) the node is not the descendant of a ZEROTREE ROOT, i.e., it is not completely predictable from a coarser scale, and (3) all of its descendants are insignificant. A ZEROTREE ROOT is encoded with a special symbol indicating that the insignificance of the coefficients at finer scales is completely predictable. To encode the binary significance map, three symbols are coded: ZEROTREES, ISOLATED ZEROS, and NON-ZEROS. In this zerotree system a static bit of coefficient indices is used and each coefficient is individually checked to determine whether (1) a symbol must be encoded or (2) it is completely predictable.

U.S. Pat. No. 5,412,741 to Shapiro ("Shapiro '741") discusses an improved zerotree system. In the Shapiro '741 system, for a given pass through the coefficients, a dominant list, used for storing coordinates of coefficients for coding, contains the coordinates of those coefficients for which one of the following two conditions apply: (1) the coefficient has not yet been found to be significant AND, a symbol will be generated on the CURRENT dominant pass, or (2) the coefficient has been previously found to be significant BUT one of its descendants satisfied condition (1).

The dominant list of Shapiro '741 excludes the coordinates of those coefficients which have not yet been found to be significant, but have ancestors that are zerotree roots. Given this condition, no symbol would be generated. However, under zerotree methods prior to Shapiro '741, this position would have to be checked to verify that some ancestor is a zerotree root. Shapiro '741 avoids wasting computation in checking the predictability of coefficients that are part of zerotrees, and thus predictably insignificant, by dynamically generating the dominant list during the dominant pass. The dominant pass is the part of iteration that discovers new coefficients significant with respect to the current threshold. At the beginning of a dominant pass, the dominant list contains the coordinates of all of the coefficients in the coarsest scale (lowest frequency) subband whether or not they have been previously found to be significant. As this list is scanned during a dominant pass, if a coefficient in the coarsest scale subband has not previously been found to be significant, then one of four symbols is encoded: (1) ISOLATED ZERO, (2) ZEROTREE ROOT, (3) POSITIVE SIGNIFICANT, (4) NEGATIVE SIGNIFICANT. Specifically, a ZEROTREE ROOT symbol is used when all of the descendants of the coefficient under consideration are either predictably insignificant, or have previously been found to be significant. In other words, a ZEROTREE ROOT implies that for all of the descendants, no symbol will be generated on the current dominant pass. In Shapiro '741, whenever a coefficient on the dominant list is not coded as a ZEROTREE ROOT, the dominant list for the current pass is appended to include the children of the current coefficient. Thus, the dominant list for the current pass will contain the coordinates of all coefficients that are not descendants of zerotrees, and thus Shapiro '741 states that the computational cost and compression time are improved.

While the system of Shapiro '741 offers computationally simple and efficient coding techniques, the time for encoding or decoding an image based on a wavelet transform can be further improved. One reason the speed of the system of Shapiro '741 can be improved is due to the Shapiro '741 system's use of arithmetic coding. The Shapiro '741 system is limited to an arithmetic coding due at least in part to very small size of the symbol set used to encode the coefficients. While Shapiro '741 specifies a certain symbol set based on certain rules for encoding coefficients, the Shapiro '741 symbol set limits efficient encoding to arithmetic coding. As known to those skilled in the art, arithmetic coding is most efficient when only a few symbols are to be used to encode coefficients, such as in Shapiro '741. Another reason the Shapiro '741 system is more suited for arithmetic coding is that Shapiro '741 only calculates a single threshold for evaluation against one bit plane before proceeding to evaluate the threshold against another bit plane. The Shapiro '741 symbol set and methodology of traversing and encoding trees of coefficients is not efficiently encoded by Huffman coding techniques.

Thus, there is a need in art for a coding system that is computational fast and efficient and that is operative for use with Huffman coding.

SUMMARY OF THE INVENTION

Generally described, the present invention provides a system that efficiently encodes a wavelet transform using Huffman coding. The present invention provides a certain set of rules for encoding, represented by a symbol set, that enables Huffman coding to be efficiently used for coding a wavelet transform. The symbol set has a sufficient number of symbols that enable efficient Huffman coding which enables faster coding in comparison to other coding methods. Also, the present invention is operative to evaluate multiple bit planes against multiple threshold values.

More particularly, a method of the present invention codes a hierarchical subband system of coefficients of a wavelet transform that is representative of an image. The wavelet transform includes coefficients organized in frequency subbands representative of the decomposition of an image. Each of the subbands is representative of a different level of frequency detail of the image. The subbands have coefficients at a same orientation and at a same spatial location as other of the subbands. The coefficients are operable for association among the coefficients by a tree structure. The tree structure relates a coefficient of a subband of a coarser level of detail to coefficients of a subband of a finer level of detail. A coefficient in a coarser subband is defined as a parent and coefficients corresponding to the same spatial location at the next finer scale from the coarse scale of similar orientation are defined as children. The descendants of children are defined as grandchildren. The set of coefficients, at a finer scale than a coarser scale, of similar orientation correspond to the same spatial location within the subband being descendants.

One step of this method includes receiving the coefficients of the wavelet transform. A second step includes selecting a first of a plurality of thresholds ranges. A third step includes comparing the coefficients of the tree structure against the plurality of threshold ranges during a first single traversal of the tree structure. A fourth step includes coding the coefficients of the tree structure with symbols based on whether the coefficients are or are not within at least one of the plurality of threshold ranges.

The method may also include coding the coefficients with symbols that indicate the manner in which the tree should be traversed. The method may additionally include the step of utilizing Huffman tables to code the symbols. The method may also include establishing an initial threshold value, T, from which the threshold ranges are selected. The method may also include selecting a first threshold level that is between T and 2 T and selecting a second threshold level that is between 2 T and 4 T. The step of coding the coefficients may include coding a coefficient with a first symbol that indicates whether the coefficient is located in a particular one of the ranges, coding the coefficient with a second symbol if the coefficient is in a second of the ranges, and coding the coefficient with a third symbol if the coefficient is not located within either of the first or the second of the ranges.

The method of the present invention may additionally include the steps of comparing the coefficients of the tree structure against a second set of a plurality of threshold ranges during a second single traversal of the tree structure and coding the coefficients during the second single traversal of tree structure based on symbols determined for the coefficient in the first single traversal of the tree structure.

Another method of the present invention may include defining a set of symbols for coding a hierarchical subband system of coefficients of a wavelet transform that is representative of an image. This method includes defining a first set of significance symbols that are representative of the significance of a coefficient with respect to a selected threshold and defining a first set of tree structure traversal symbols that indicate the path in which the tree structure should be traversed and the tree structure traversal symbols being operative for combining with selected ones of the significance symbols.

The step of defining the first set of significance symbols may include defining a first significance symbol that indicates if the coefficient is located in a particular one of a plurality of threshold ranges, defining a second symbol that indicates if the coefficient is in a second of the plurality of threshold ranges, and defining a third symbol that indicates that a coefficient is not located within either of the first or the second of the ranges. This method may include defining a first traversal symbol that indicates that the descendants of a particular coefficient should be traversed in the tree structure and defining a second traversal symbol that indicates that the sibling of a particular coefficient should be traversed in the tree structure.

BRIEF DESCRIPTION OF THE DRAWINGS

The accompanying drawings illustrate preferred and alternative embodiments of the present invention and, together with a general description given above and the detailed description of the embodiments given below, serve to explain the principles of the present invention.

DETAILED DESCRIPTION OF THE INVENTION

Figures 1, 2A:
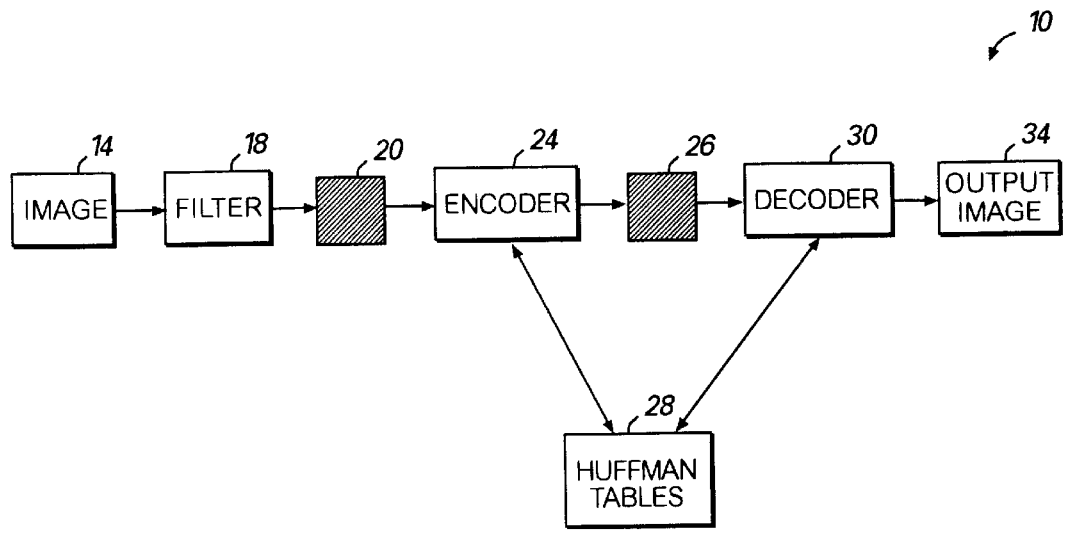
FIG. 1 is a general block diagram of a system of the present invention.
FIG. 2a is a diagram of a wavelet transform used in connection with the present invention.

Referring to the figures, various embodiments of the present invention are described. Referring to FIG. 1, the coding system 10 operating according to the present invention is shown. The coding system 10 encodes a wavelet transform using a depth-first bit plane traversal. Depth-first bit plane traversal refers to evaluating all ancestors or descendants of a coefficient before evaluating the siblings of the coefficient. In previous zerotree coding methods, the order was "breadth first"; that is, siblings evaluated before descendants. Unlike some conventional image coding for a wavelet transform, the present invention provides a simple methodology that uses Huffman coding techniques for encoding the wavelet transform. The present invention advantageously provides an encoding and decoding process that performs quickly and reliably and in many cases performs faster than prior methods applied to wavelet transforms.

The coding system 10 traverses "trees" of a wavelet transform in a depth-first order and evaluates multiple bit planes during a single iteration. An iteration is generally defined as one of a plurality of repeated loops through an evaluation sequence of the coefficients of a wavelet transform or data structure. In order not to unnecessarily encode elements of a plane when multiple planes are being scanned, the present invention utilizes a prediction mechanism to determine whether each of the multiple planes should be encoded. Additionally, the Huffman encoding of coefficients used in connection with the present invention is based on information recorded during the previous iteration or evaluation of the coefficient being considered. For example, if the coefficient being evaluated for the current iteration was insignificant in the previous iteration, but had significant descendants, the system of the present invention selects a certain Huffman table for coding. To aid in making predictions and determining prior information related to the coefficient, the system of the present invention defines a unique symbol set that is used to encode the coefficients of the wavelet transform. The use of the type symbol set described herein facilitates the use of Huffman tables.

As known to those skilled in the art, Huffman tables used for coding are organized in a manner that reflects the probability of a certain element occurring in a given data set. Consequently, each Huffman table used in accordance with the present invention is constructed and based on the probability of an element occurring in view of the symbol set code selected for a coefficient. Those skilled in the art may associate Huffman tables with a symbol set based on the particular coding or data set involved.

An image 14 is decomposed using a standard sampling filter 18. The filter decomposes the image into four frequency subbands. The output of the filter 18 is termed a wavelet transform 20. The wavelet transform 20 is processed by the encoder 24 to generate a compressed image 26. The encoder 24 efficiently generates the compressed image 26 using Huffman tables 28. Prior low bit rate image coding systems which use zerotree prediction are not generally operative to Huffman encode more efficiently than the system arithmetic encode. The compressed image 26 may be decompressed using the decoder 30. The decoder 30 likewise utilizes Huffman tables 28 to produce the output image 34. Thus, by utilizing the type symbol set defined herein and by utilizing Huffman tables, the present invention is operative to provide a fast and reliable image encoding system 10.

Referring to FIG. 2a, an example wavelet hierarchical subband decomposition (wavelet transform) is illustrated with selected coefficient values shown. The image is decomposed using times two sub sampling to produce four frequency subbands. The four frequency subbands are: high horizontal-high vertical (HH), high horizontal-low vertical (HL), low horizontal-high vertical (LH), and low horizontal-low vertical (LL). The subbands are further subsampled times two in a recursive process, as known by those skilled in the art, to produce a set of subbands that have coefficients as shown in the array (wavelet transform) in FIG. 2a. The array of FIG. 2a has subbands labeled LL3, LH3, HL3, HH3, LH2, HH2, HL2, LH1, HH1, and HL1. This discrete wavelet transform illustrates three subsamplings. However, it should be appreciated that more subsamples (e.g. 4 to 6) may be used in practice. The subband levels 38 are labeled 0, 1, 2 and 3 along the horizontal and vertical axis. The top left subband, LL3 is the lowest frequency subband of FIG. 2a and the bottom right frequency subband, HH1, is the highest frequency subband. The relationship of coefficients in the wavelet transform 20 are generally represented by trees and described in terms of parent-child relationships as generally discussed above. In a wavelet transform, the magnitude of wavelet numbers or coefficients become smaller as the distance from the root of the tree increases. The property of decreasing magnitude of the coefficients as the coefficients increase in distance from the root of the tree is exploited in compression techniques. Also, the further away the coefficient is from the root of a tree the higher the frequency.

The total number of coefficients in lowest frequency subbands HL, LH and HH determine how many trees you have. The depth of the tree is determined by the number of coefficient levels as defined in a "tree". Because each of the lowest frequency subbands, HL3, HH3 AND LH3 each have 4 coefficient values, twelve trees result from the example of FIG. 2a. As noted above, levels are also referred to as subbands. Values in the high frequency range generally indicate that finer detail is in that level, such as when color varies rapidly within an image. Low frequency, on the other hand, indicates that color varies slowly and the detail is coarser. The transform filter maps the lower frequency components of the image to the upper left hand portion of the wavelet transform array.

Figure 2B:
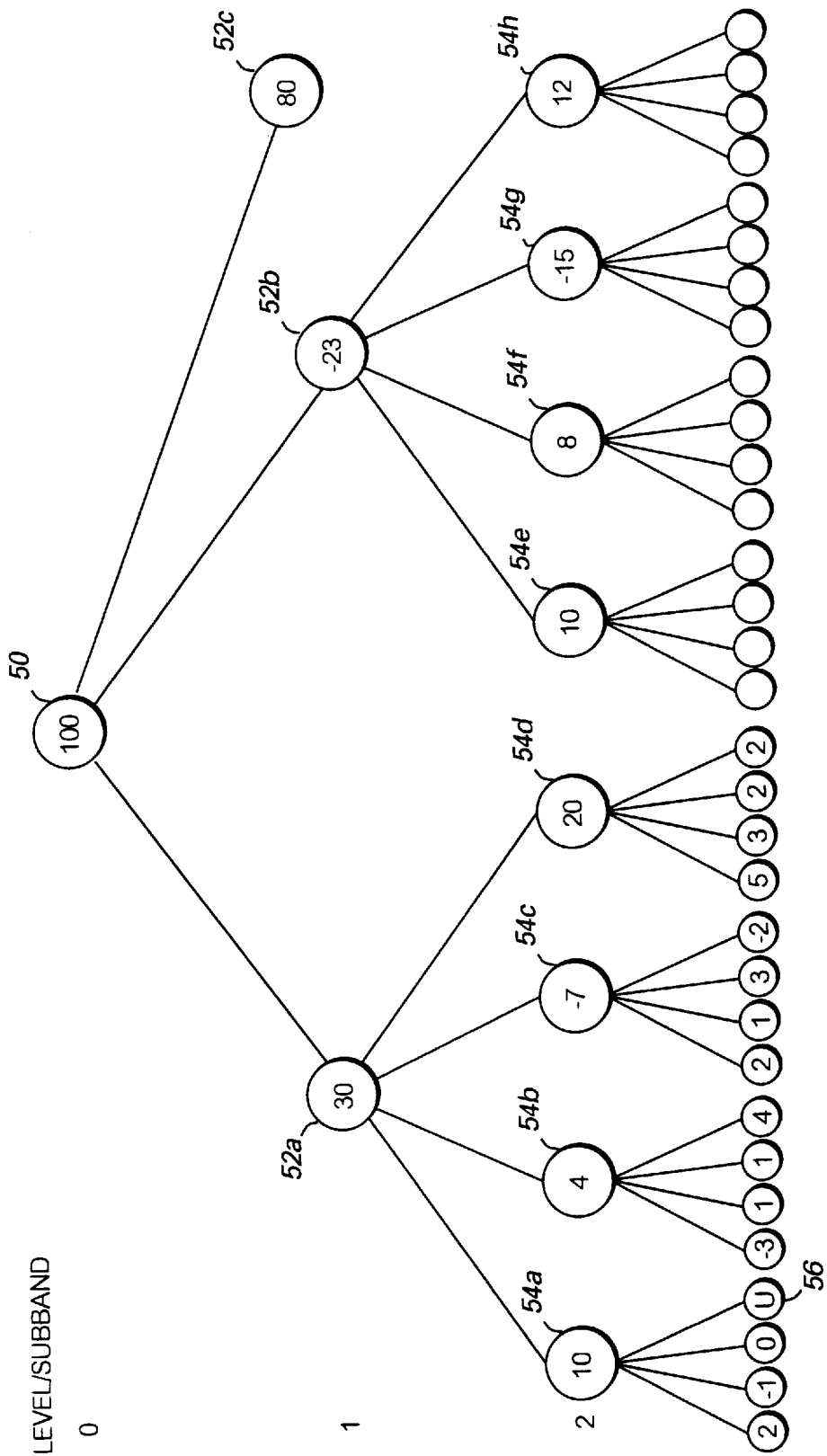
FIG. 2b is a diagram of a tree structure used in connection with the present invention.

Referring to FIGS. 2a and 2b, the manner in which trees are constructed or viewed in a wavelet transform is illustrated. The parent-child relationship for four generations of a subsampled image is illustrated. The four generations are subbands/levels 0, 1, 2, and 3. A single parent node 50 of the LL3 subband has 3 child nodes, 52a, 52b, and 52c. Generally each node has four children or offspring except for the LL band. For example, each child node 52 has four child nodes. Particularly, the child node 52a has four child nodes, 54a, 54b, 54c, and 54d. Similarly, the child node 52b has four child nodes, 54e, 54f, 54g, and 54h. Each of the child nodes 54 has child nodes 56i. The children of a particular coefficient of a subband are located in the same relative position (FIG. 2a) in the children's subband as the coefficient being considered. For example, the child node 52a has a coefficient value "30" and is located in the HL3 subband. The children of a child node 52a are located in the upper left hand corner of the HL2 subband and have the values "10", "4", "–7", and "20". Similarly, the child node 54d has a coefficient value of "20" and the children of the coefficient "20" are in the HL1 subband in the same relative position. The children of the child node 54d are "5", "3", "2", and "2". The same type parent-child relationship is utilized throughout the wavelet transform 20. Descendants are considered to be children and their children and so forth. Grandchildren are considered to be all descendants excluding children. "Ancestors" have the reverse or opposite lineal relationship to other nodes or coefficients as compared with descendants.

Figure 3:
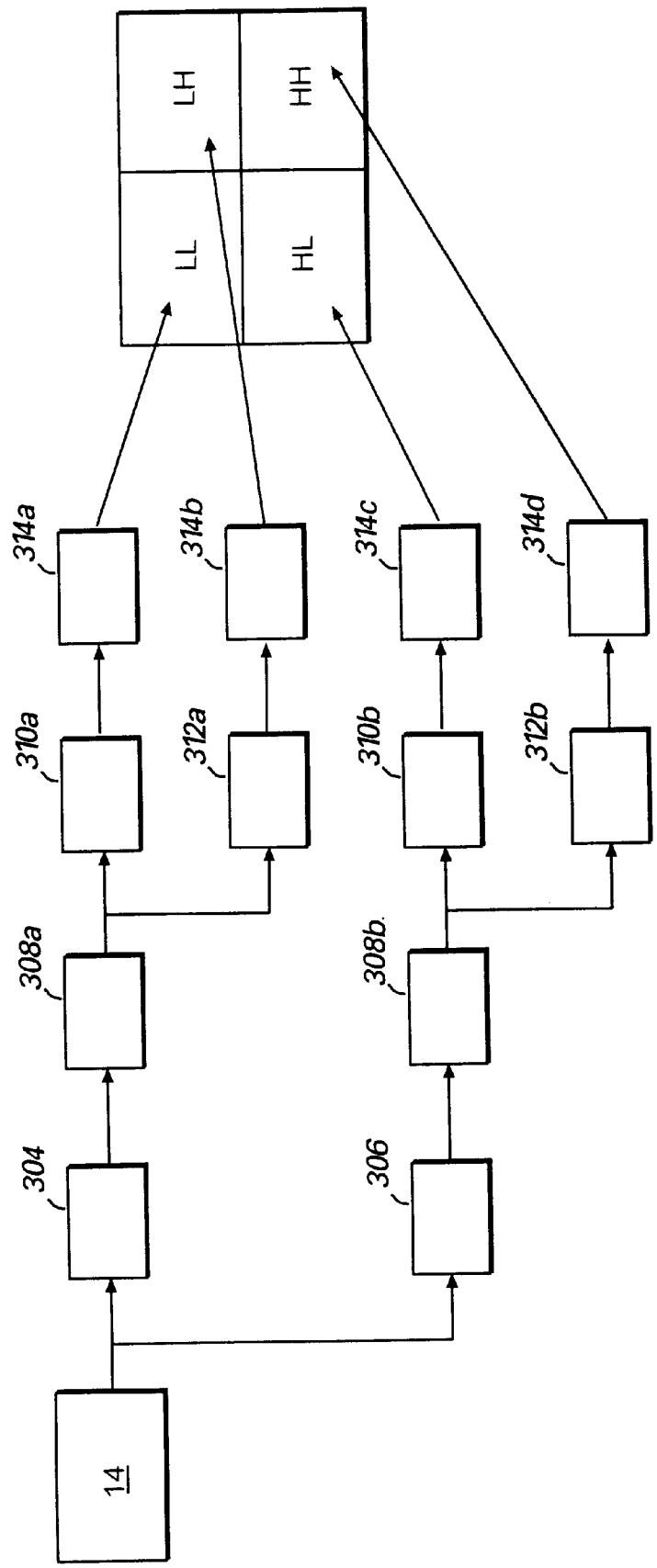
FIG. 3 is a diagram of a filter that may be used to generate a wavelet transform.

In the present invention, the roots of the trees are coefficients in the lowest frequency subbands HL, LH and HH. Referring to FIG. 3, a filter used in constructing a wavelet transform 20 is shown. The input image 14 is filtered by a horizontal low pass filter 304 and a horizontal high pass filter 306. The outputs of the horizontal low pass filter 304 and horizontal high pass filter 306 are horizontally subsampled times two by the two horizontal subsampling filters 308a and 309b. The horizontal low pass output signal from the horizontal low pass filter 304 and the horizontal high pass filter 306 are vertically low pass and high pass filter by the low pass filters 310a and 310b and high pass filters 312a and 312b. The outputs are vertically subsampled times two by vertical subsampling filters 314a, 314b, 314c, and 314d. Subband components LL, LH, HL and HH are output by the filters as shown. These outputs are stored in an array 320 as shown. The filters associated with the filter 18 are preferably digital quadrature mirror filters (QMF) for splitting the horizontal and vertical frequency band into low frequency and high frequency bands. Additional subbands are produced by repeatedly performing a one-scale subband decomposition on the LL subband. QMF filters at each decomposition level are similar to one another. These type filters are well known in the art. The filter 18 performs its decomposition operation to produce the wavelet transform 20 by processes implemented in a computer system. Additionally, the encoding and decoding processes of the present invention are implemented in a computer system.

Figure 4:
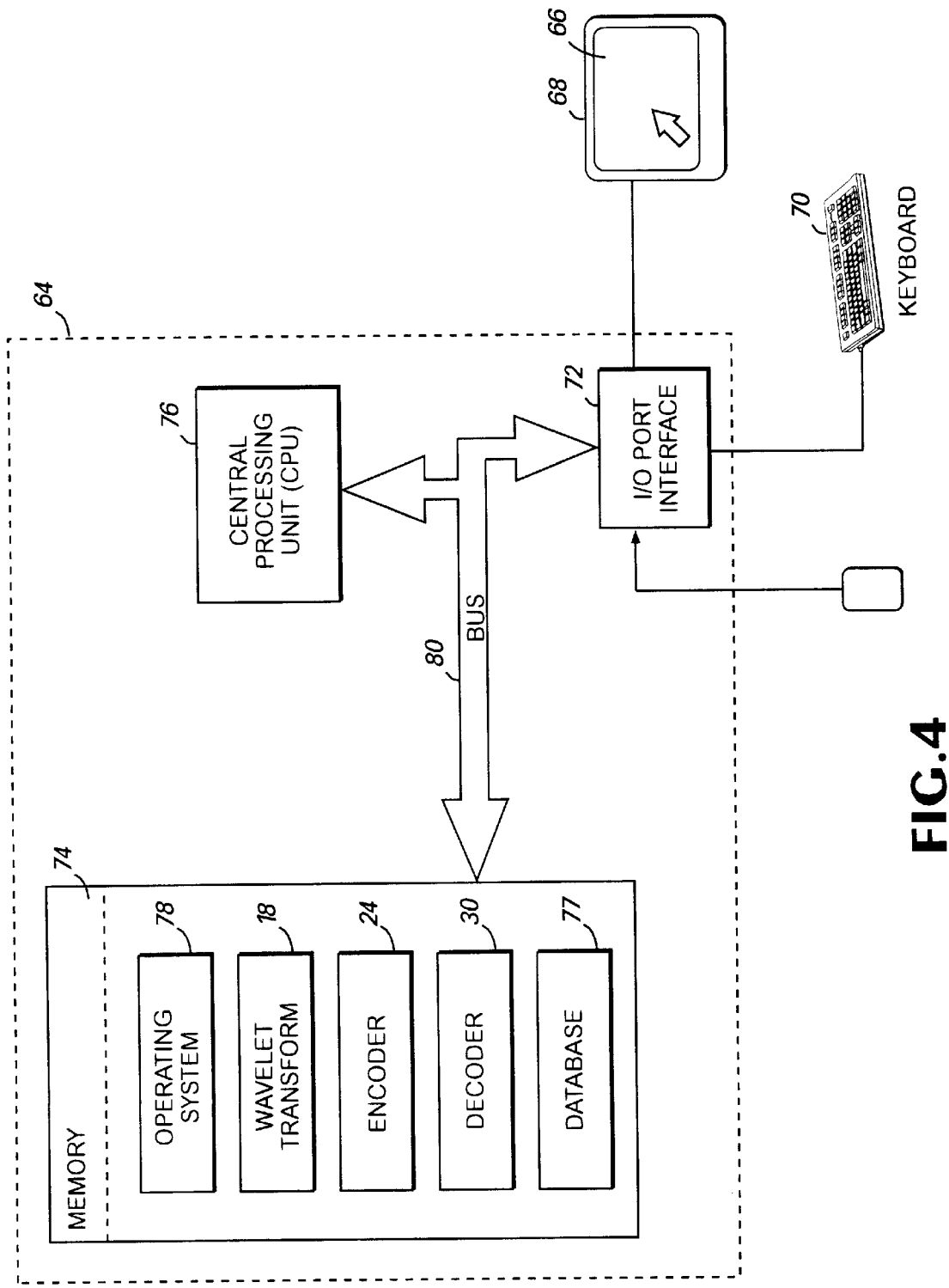
FIG. 4 is a diagram of a computer used in connection with the present invention.

Referring to FIG. 4, a computer system 64 that may be used in connection with the present invention is illustrated. The computer system 64 includes a graphical user interface 66 that may display an image on a display monitor 68. The graphical user interface 66 is implemented in conjunction with the operating system to display and manage the information of computer applications and the operating system. The graphical user interface 68 is implemented as part of the computer system 64 to receive input systems from a conventional keyboard 70 or from a mouse or other input device via an input/output interface 72. These input devices enable a user to select options that may include specifying the decomposition of an image, the encoding of an image, the decoding of an image, or any other process implemented in the present invention.

For simplicity of the drawings, many components of a standard computer system have not been illustrated, such as address buffers, memory buffers and other control circuits because these elements are well known and illustrated in the prior art and are not necessary for an understanding of the present invention. The computer programs used to implement the various steps or processes of the present invention are generally located in the memory unit 74 and the processes of the present invention are carried out using a central processing unit 76. Those skilled in the art will appreciate that the memory unit 74 is representative of read-only and random access memory. The memory unit also contains a database 77 that stores data and tables that may be used in conjunction with the present invention. A computer system suitable for use with the present invention may contain 16 MB of RAM, a 240 MB hard drive and 486 microprocessor manufactured by Intel Corporation of Santa Clara, Calif.

With continuing reference to FIG. 4, the CPU 76 is typically implemented as a single-chip microprocessor. The CPU 76, in combination with computer software, such as an operating system 78, the wavelet transform filter 18, the encoder 24, and the decoder 30, control certain operations of the computer system 64. The operating system 78, in conjunction with application programs, control the allocation and usage of hardware and software resources such as memory, CPU time, disk space, printer and peripheral devices, such as the display monitor 68. The present invention includes a bus 80 of the computer system that supports communications, control, address, and data signals between the CPU 76 and the remaining components of the computer system 64. It should be appreciated that different types of buses are used in a computer system and that the bus 80 generally represents the various types. The memory unit 64 and the central processing unit 76 are connected by the bus 80 which is designed to provide an electrical interface between computer system components. The processes implemented by the central processing unit 76 may be communicated as electrical signals along the bus 80 to an input/output device. The computer system 64 has an input/output port 72 that may be used to receive data from outside sources. For example, an image may be transmitted from another device or peripheral through the input/output port 72 for processing in accordance with the present invention.

In this detailed description, numerous details are provided such as computer system elements, formats, sample data, etc., in order to provide an understanding of the present invention. However, those skilled in the art will understand that the present invention may be practiced without the specific details. As generally discussed herein, a method or process within a computer system is generally a sequence of computer-executed steps leading to a desired result. It should be understood that the programs, processes, objects, etc., described herein are not related or limited to any particular computer or apparatus. Rather, various types of machines may be used with programs operating in accordance with the teachings herein.

Wavelet Tree Traversal

As noted above, the present invention utilizes a depth-first iterative bit plane encoding process. The system of the present invention may operate with a discrete wavelet transform (DWT) for an N pixel by M pixel image that has been computed and stored in a one dimensional (I-D) buffer of length N×M. Because the wavelet transform is a hierarchical subband decomposition, the wavelet coefficients are associated by "trees" in the same subband across different scales or depths, as discussed above. Thus, at the first scale in subbands UL, LH and HH, there are a "forest" of coefficient trees whose "roots" lie within the first scale and whose "branches" go across the higher resolutions. The sequence of symbols generated during the coding process are uniquely decodable since the trees are scanned in HL, LH, and HH subband order and in an a priori fixed manner. An example depth-first scanning order is illustrated in FIG. 5.

Figure 5A:
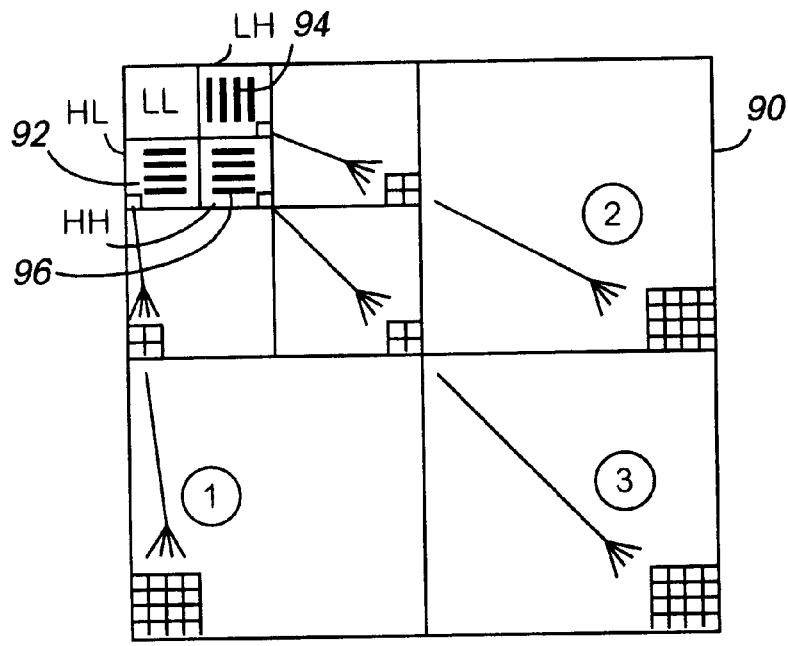
FIGS. 5a and 5b is a diagram of the tree traversal process used in connection with the present invention.
Figure 5B:
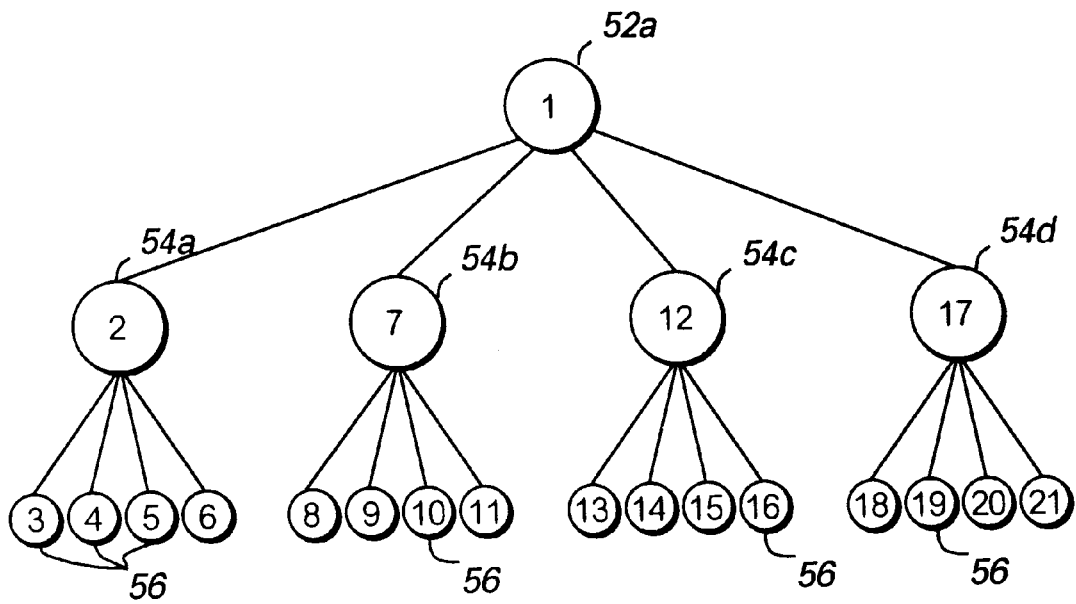

Referring to FIG. 5a, a sample depth-first scanning order is illustrated. Referring to the wavelet transform 90, the diagram shows that the roots in the first scale in subband HL are scanned in row-major form as indicated by the arrows 92. Also the diagram indicates that the roots in the first scale in subband LH are scanned in column-major form as indicated by the arrows 94. Also the diagram shows that the roots in the first scale in subband HH are scanned in row-major form as indicated by the arrows 96. The LL subband coefficients are considered to be roots. These LL subband coefficients are initially considered significant with subsequent iterations providing successive approximation as with the high frequency subband coefficients. FIG. 5a also illustrates by the numbers 1, 2 and 3, that the HL frequency components are scanned first, followed by the LH frequency components, followed by the HH frequency components. FIG. 5b illustrates the scanning order of children within the wavelet transform 20 in a depth-first manner. The order traversed is referred to as depth first traversal because the descendants of a coefficient are scanned or evaluated before the siblings of the coefficient are scanned or evaluated. The numbers inside the circles of the tree indicate the order in which coefficients are traversed in a depth-first manner. As represented by the numbers 3, 4, 5 and 6, the children of the coefficient 54a, are scanned before the sibling coefficient 54b of 54a. This order or manner of traversal is implemented on the multiple trees of the wavelet transform.

Tree Encoding/Decoding Symbols

As noted above, the present invention evaluates two bit "planes" or two thresholds during a single iteration. In conventional systems, the coefficients of a tree are evaluated against a single threshold during a single iteration. However, in the present invention, during a single iteration, the process evaluates the coefficients against multiple levels of thresholds ranges ("planes"). As in conventional coding systems, the present invention indicates whether a coefficient is insignificant or significant with respect to some thresholds. In conventional systems, significance generally indicates that the coefficient is greater than the threshold and insignificance indicates that the coefficient is less than the threshold. However, the present invention differs in one respect from conventional systems in that the present invention defines at least two types of significance variables with respect to two significance thresholds levels or ranges for coding the coefficients of a tree. The two significance symbols used in the present invention are "S1" and "S2" where S1 significance is preferably greater than S2 significance. The insignificance symbol is preferably denoted by an "I". Insignificance means that a coefficient is below a certain threshold. Therefore, the set of significance symbols is [S1, S2, I]. Additionally, the present invention provides a set of tree traversal/grouping symbols that indicate whether or the manner in which the descendants and/or siblings of a particular coefficient should be further evaluated. Using the tree traversal/grouping symbols, the present invention is enabled to make predictions regarding the likelihood that descendants of the coefficients being evaluated will become significant in a subsequent iteration, and therefore, the system of the present invention may encode or decode the coefficients in an efficient manner. An advantage of evaluating two planes or multiple threshold levels in a single iteration is that the number of insignificant symbols that are produced is reduced as compared to the conventional systems, thus, saving bit space or storage space. The tree traversal/grouping symbols used herein are [D, N, G].

Figure 6A:
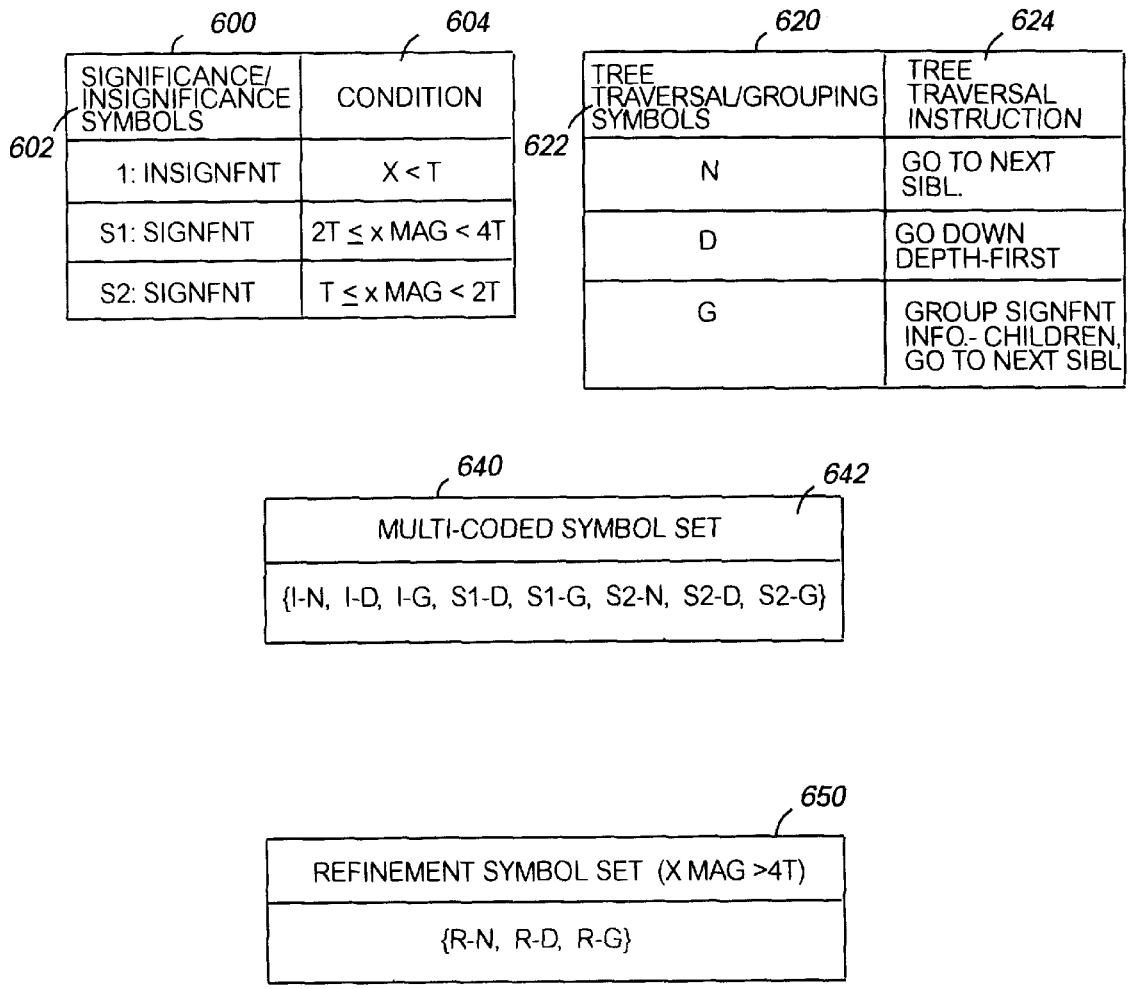
FIG. 6a is a diagram of a symbol set of the present invention used for coding a wavelet transform.

Referring to FIG. 6a, a significance symbol table 600 specifies the conditions upon which a coefficient is labeled significant or insignificant. The significance symbols 602 are I, S1 and S2. The condition 604 specifies the conditions upon which a coefficient is encoded with the significance symbols 602. Particularly, a coefficient is labeled insignificant if the coefficient is less than a calculated threshold value T. A coefficient is labeled S1 significant if the magnitude of the coefficient "x" is between 2 T and 4 T. If the magnitude of the coefficient x is between T and 2 T, the coefficient is labeled S2 significant. Thus, the symbol set of the present invention utilizes at least three symbols to indicate the relative significance of coefficients of a tree during an iteration.

The tree traversal/grouping table 620 shows the tree traversal/grouping symbols 622 represented as N, D, and G. The tree traversal/grouping symbols are associated with a corresponding tree traversal instruction 624. The tree traversal/grouping symbol N indicates that all descendants of the coefficient under consideration are insignificant. Consequently, the tree traversal/grouping symbol N has associated therewith an instruction that indicates that tree traversal with respect to the coefficient being evaluated should proceed to the next sibling. The tree traversal/grouping symbol D indicates that the coefficient has significant grandchildren where by grandchildren includes all descendants excluding children. The tree traversal instruction corresponding to the tree traversal/grouping symbol D instructs the tree traversal process to go down or traverse the tree depth-first with respect to the coefficient. Traversing the tree in response to the D symbol enables the significant grandchildren to be encoded. In this case (symbol D), the child node may be significant or insignificant. The traversal/grouping symbol G indicates that the coefficient under consideration has a significant child, but does not have significant grandchildren. Because no grandchildren are significant, the tree traversal/grouping symbol G indicates that the process should proceed to the next sibling in addition to grouping or storing the significance information of the children of the coefficient under consideration. Thus, this tree traversal process aids in facilitating encoding without unnecessary encoding or evaluation of descendants as insignificant.

Referring to the table 640 of FIG. 6a, a group of single, multi-coded symbols are shown as the multi-coded symbol set 642. The multi-coded symbol set 642 represents the possible combinations of the significant symbols 602 and the tree traversal/grouping symbols 622. The symbols of the multi-coded symbol set 642 are: [I-N, I-D, I-G, S1-N, S1-D, S1-G, S2-N, S2-D, S2-G]. The multi-coded symbol set 642 is used to encode and decode the coefficients of a tree as stored in a significance list of indices of the respective coefficients. Using the multi-coded symbol set 642 enables Huffman Tables to be efficiently used for coding in the present invention. Also, using two separate symbol sets does not require storing a plurality of symbols specifically designated for each type of coding but instead enables coding symbols to be generated on an as needed basis from the two symbol sets. Thus, the system of the present invention provides a modular symbol set.

The table 650 of FIG. 6a represents a refinement symbol set. The refinement symbol is indicated by "R". As with the significance symbols 602, the refinement symbol R may be combined with the tree traversal/grouping symbols N, D, and G. A refinement symbol is used if the coefficient under consideration was previously discovered significant (the magnitude of the coefficient was greater than the threshold for the top bit plane). The symbol transmitted for such a coefficient is from the refinement symbol set 652. The refinement symbol set is [R-N R-D, R-G]. A refinement symbol is used when the coefficient x is greater than the largest threshold being evaluated in which case the threshold should be refined to further identify the coefficient value.

Figure 6B:
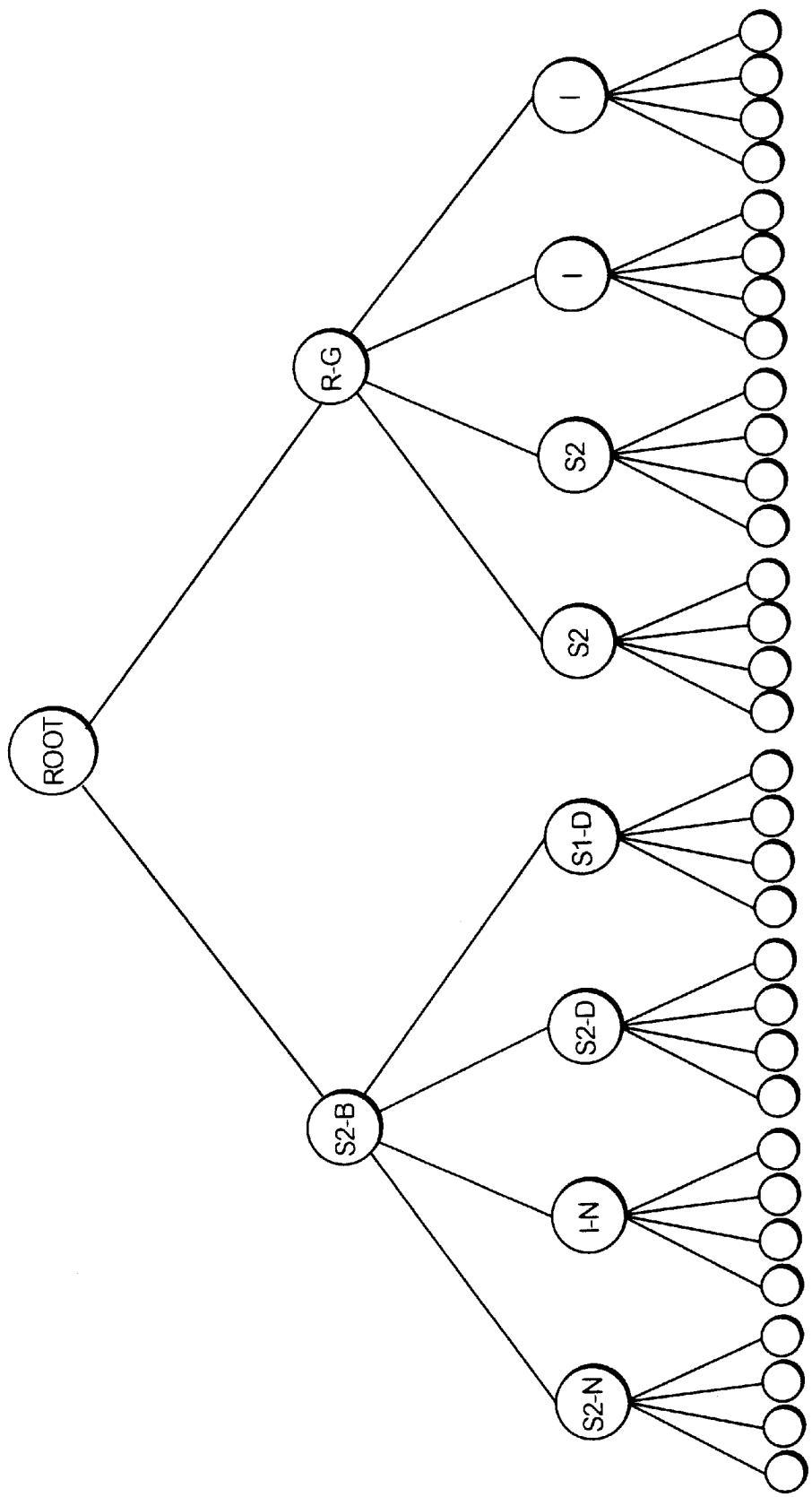
FIG. 6b is a diagram of a partially encoded tree.

Referring to FIG. 6b, an example of the results of a partially encoded tree is illustrated.

Thresholds and Bit Planes

Figures 7A, 7B:
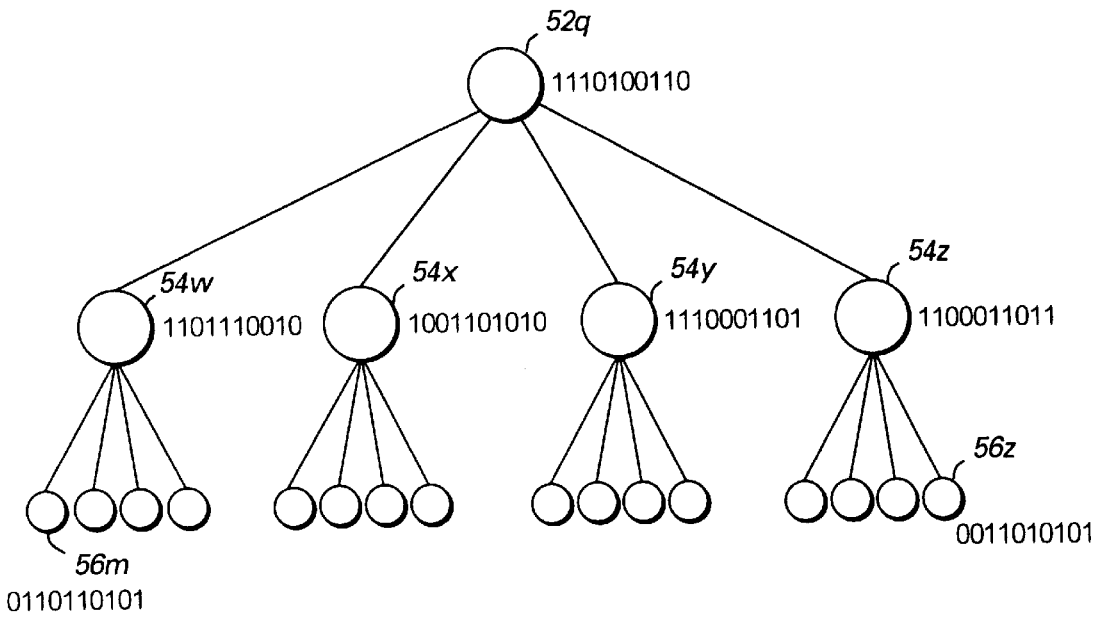
FIG. 7a is a diagram of a tree structure used in connection with the present invention that has the coefficients expressed in binary numbers.
FIGS. 7b and 7c show the relationship of bit planes and threshold values and the processes of evaluation of the bit planes during iterations of analyzing the tree structure.

Referring to FIG. 7a, a tree structure representing the coefficients of a wavelet transform is illustrated. The coefficients are illustrated in their binary form. For example, the value of the coefficient 52q is represented by the binary sequence 1110100110 and the value of the coefficient 54w is represented by the binary sequence 1101110010. By representing the coefficient values in their binary form, a bit plane analysis of the coefficients can be performed. Referring to FIG. 7b, the coefficients 54q and 54w are shown as evaluated in a first iteration. Each binary value of a coefficient may be generally termed a "k" bit. These values are said to be in a kth plane depending on the location of the binary value in the binary representation. The k bits are ordered from 0–9 as illustrated. Thus, the k bits represent bit planes for the binary representations.

In FIG. 7b, nine bit planes are shown for the coefficients 54q and 54w. For the coefficient 54q, the values in the 9th, 8th, 7th, 6th, and 5th bit planes are 1, 1, 1, 0, and 1, respectively. The corresponding threshold values are related by the function $T=2^k$. Thus, the threshold value representation for the 9th bit plane is 512 and the threshold representation for the 2nd bit plane is 4. FIG. 7b also indicates that two bit planes, the 8th and 9th, are evaluated during a single iteration by the label MSB which represents a most significant bit pass. In the MSB pass, a list of indices of significant coefficients is constructed. During the same iteration, two bit planes, the 8th and 9th, are also evaluated during the most significant bit pass for the iteration. After the MSB pass a least significant bit pass (LSB) is performed on the bit plane that follows the two evaluated bit planes, which in this case is 7th bit plane. The LSB pass provides an indication of how the bits are to be evaluated on subsequent iterations. A most significant bit pass and least significant bit pass is performed for each iteration. In a second iteration of the system of the present invention, the 6th and 7th bit planes of coefficients would be evaluated in the most significant bit pass and the 5th bit plane would be evaluated in the least significant bit pass.

Figures 7C, 8:
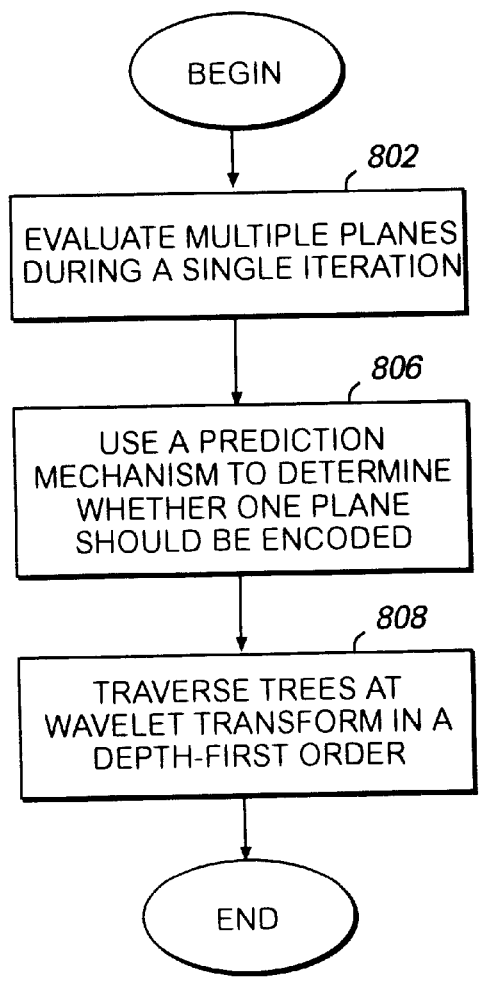
FIGS. 8–12 are flow diagrams of the processes of the present invention.

Referring to FIG. 7c, the table 700 shows the manner in which S1 and S2 significance can be evaluated with respect to threshold values and to k planes. For example, S2 significance is determined by the following T<x<2 T. An efficient evaluation of significance can be made by analysis of whether a bit is a 1 or 0 in a specified plan. For example, S2 significance is also indicated if the k+1 th bit=0 and kth bit=1. Similarly, S1 significance is determined by the following 2 T<x<4 T. S1 significance is also indicated if the k+1 th bit=1.

Encoding Processes for a Wavelet Transform

The preferred steps of the method for encoding a wavelet transform is shown in flow diagrams 8–9C. The steps of the preferred method are implemented with computer programs operating on the computer system 64 as discussed above. The preferred steps are discussed in conjunction with FIGS. 1, 2A, 2B, 5 and FIG. 6A.

Referring to FIG. 8, a flow diagram of the general processes of the present invention are shown. The processes described in FIG. 8 operate in conjunction with a predetermined wavelet transform. At step 802, multiple planes are evaluated against multiple threshold values during a single iteration. Preferably, two "planes" are evaluated during a single iteration. The process indicates whether a coefficient is insignificant or significant with respect to multiple thresholds.

The process then proceeds to step 804. At step 804, the processes of the present invention utilize a prediction mechanism to determine whether the coefficients of the multiple planes should be encoded. Here, at step 804, the present invention does not encode the coefficients of a plane if the prediction mechanism indicates that the plane should not be encoded. Thus, the method and processes of the present invention helps to avoid unnecessary encoding of insignificant coefficients. As noted above, at step 808 the process traverses the trees of a wavelet transform in a depth-first manner as generally shown in FIG. 5. The process of FIG. 8 enables fast and efficient encoding of a wavelet transform, thereby providing an improved compression method.

Figure 9A:
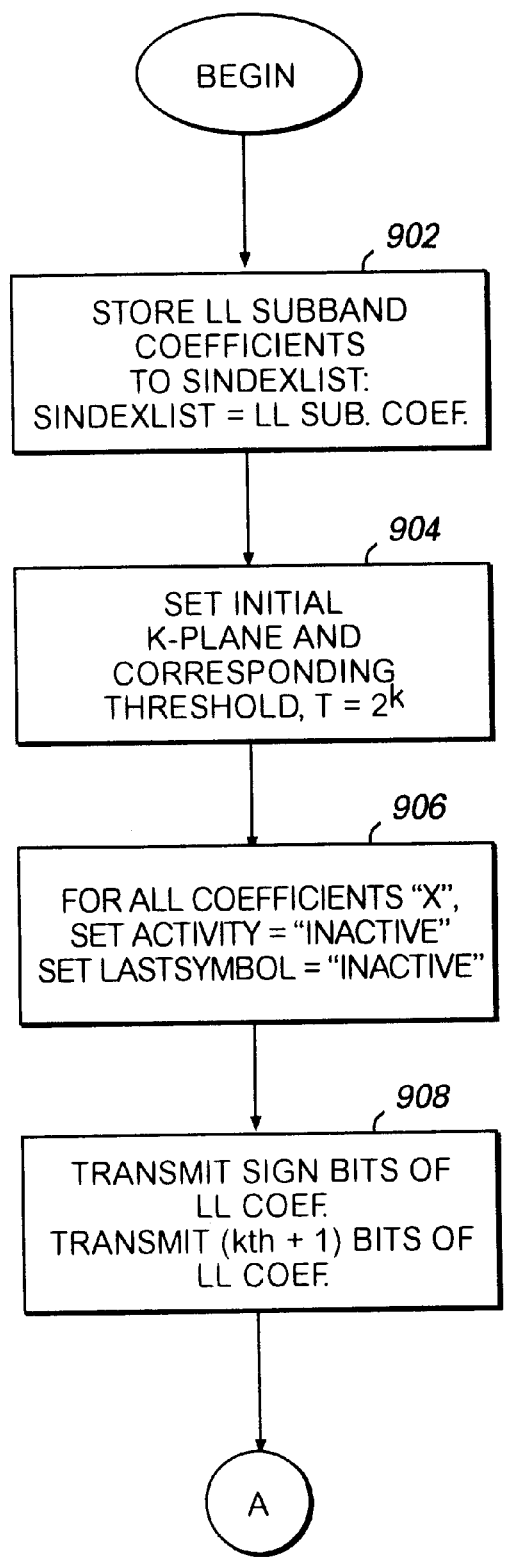
Figure 9B:
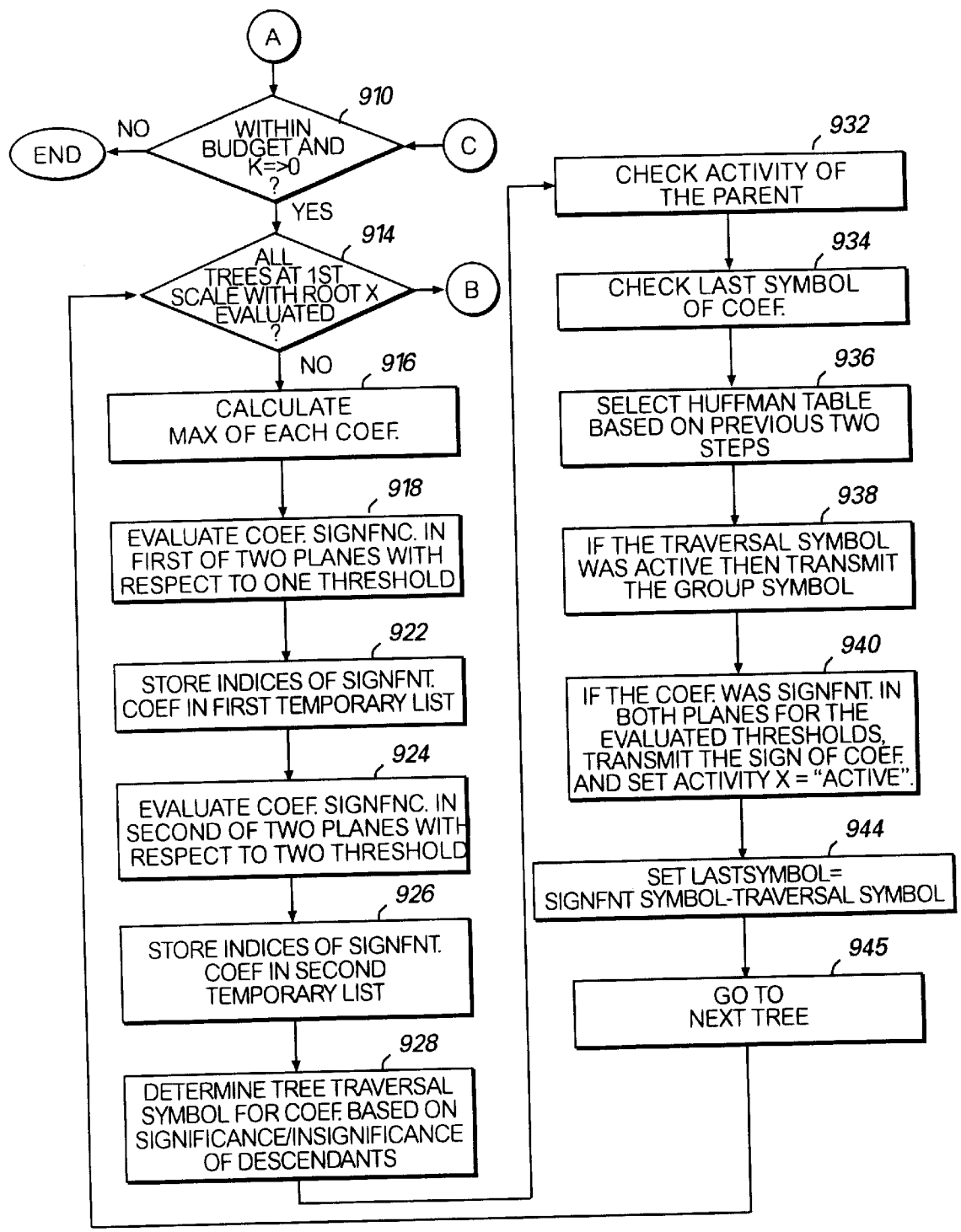
Figure 9C:
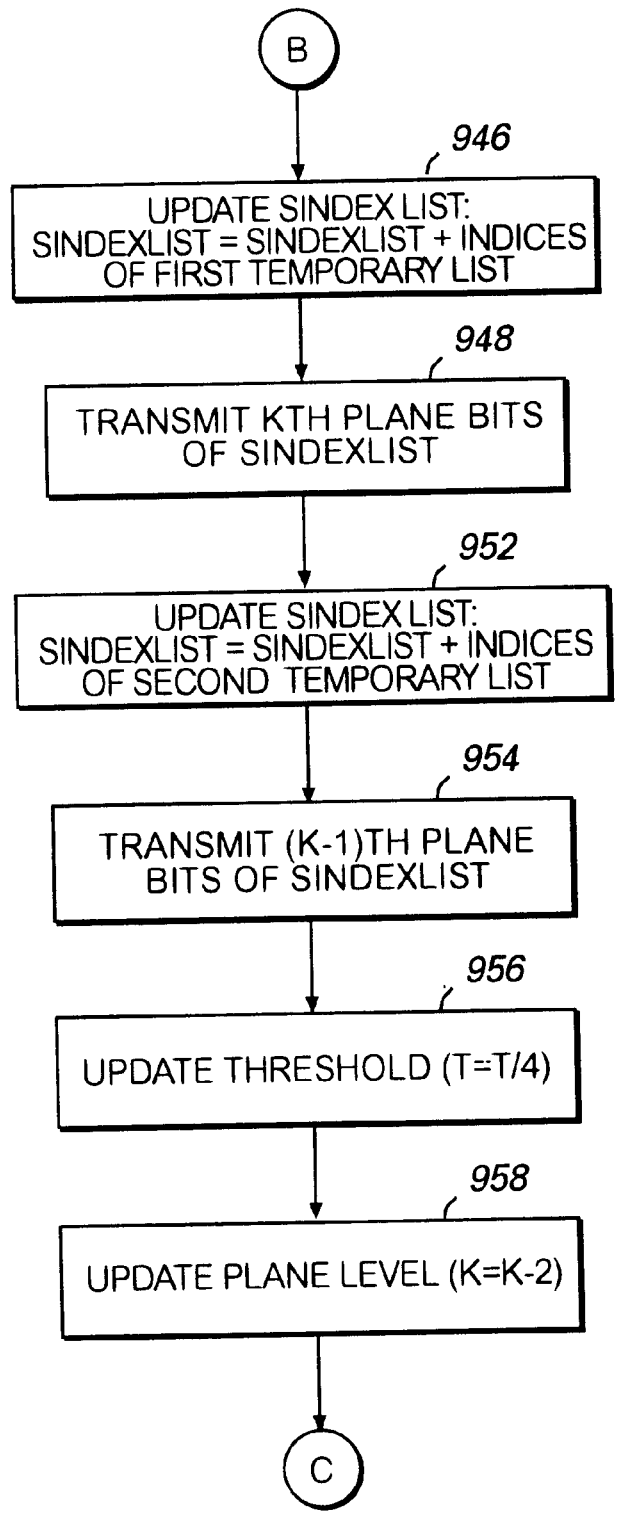

Referring to FIGS. 9a, 9b and 9c, a more detailed description of the processes of the present invention is discussed. The process begins at step 902. At step 902, the LL subband coefficients are stored to the first significance index list (S1 index list). The process proceeds to step 804 where the initial k-plane and threshold T are set. The initial k-plane is set to equal the upper ceiling [log 2 (max)] minus 2. The upper ceiling is the smallest integer greater than or equal to some number. For example, the upper ceiling of 4.3 is five. Max is the maximum of magnitude of all coefficients in the wavelet transform of a number. Preferably, the initial threshold T is set to $2^k$. Having set the initial k plane and the threshold T, the process proceeds to step 906 where for all coefficients the activity level of the coefficient and the last symbol for the coefficient are set to "inactive". If the coefficient has been found significant with respect to the evaluated threshold, the coefficient is considered to be "active". In contrast, if the coefficients have not been found insignificant with respect to the evaluated threshold, the activity level is set to "inactive". The process then proceeds to step 908. At step 908, the sign bits of the coefficients are transmitted as well as the plane "k+1" th bits of the LL coefficients. Steps 902 through 908 are the initialization steps for beginning the encoder process.

The process then proceeds to step 910 of FIG. 9b. At step 910, the beginning of the iteration loop for the encoder begins. At step 910, the process determines whether bits are available for encoding and whether k is greater than or equal to zero. If the bit budget has been exceeded or if k is less than zero, the iteration process ends. However, if the encoded bits is within budget and if k is greater than or equal to zero, the process proceeds to step 914. At step 914, the process determines whether all trees at first scale have been evaluated. If not, the process proceeds to step 916. At step 916, the max of each coefficient in the tree is calculated. Max of a coefficient is the maximum magnitude of its descendants. This value is later used to generate symbols for a coefficient by comparing its max value with the given threshold. Once the max value of a coefficient has been computed in the first iteration, then in subsequent iterations the max value is updated value only when some descendent was discovered significant in the previous iteration. The process then proceeds to step 918. At step 918, the significance of the coefficient in the first (first threshold) of two planes is evaluated. At step 922, the indices of the coefficient are stored in a first temporary list SI Index List if the coefficient was determined to be significant with respect to the first threshold. At step 924, the coefficient significance in the second (second threshold) of two planes is evaluated with respect to the second threshold. If the coefficient is determined to be significant at step 924, the indices of the significant coefficient are stored in a second temporary list S2 Index List at step 926. The process then proceeds to step 928.

At step 928, the process of the present invention determines the tree traversal symbol as discussed and illustrated in FIG. 6 for the coefficient based on the significance or insignificance of the descendants of the coefficient. The process then proceeds to step 932. At step 932, the "activity" of its parent is checked. The process then proceeds to step 934. At step 934, the last symbol stored for the coefficient from the multi-coded symbol set 642 of FIG. 6 is checked. The process then proceeds to step 936. At step 936, the process determines which Huffman table should be selected for encoding based on both the coefficients "activity" and the last symbol of the coefficient.

The process proceeds to step 938. At step 938, the multi-coded symbol for the coefficient as determined in steps 918, 924 and 928 is transmitted to the decoder. If, at step 940, the coefficient was determined to be significant in either of the two planes (Steps 918 and steps 914) for the evaluated thresholds, the sign of the coefficient is transmitted and the activity of the coefficient is set to "active". The process then proceeds to step 944. At step 944, the process sets the last symbol variable to equal the significance-traversal symbol determined for the coefficient during the current iteration. The process then proceeds to step 914. At step 914, if all trees have been evaluated, the process proceeds to step 946 of FIG. 9c.

FIG. 9c illustrates the processes used to transmit refinement bits of coefficient that have been discovered to be significant in previous iterations. The processes of FIG. 9 may be termed the least significant bit pass (LSB). In the LSB pass, the following less significant bit of the coefficient being evaluated is sent to the decoder. At step 946, the significance index list is updated. Here, the indices of the coefficients of the first temporary list are added to the significance index list. The indices of the first temporary list indicate the location of coefficients found to be significant with respect to the first threshold. The process then proceeds to step 948. At step 948, the process transmits kth plane bits of the significance index list. The process then proceeds to step 952. At step 952, the significance index list is updated again. However, the S index list is now updated to include the indices of the second temporary list. The indices of the second temporary list indicate the location of the coefficients found to be significant with respect to the second threshold. The process then proceeds to step 954. At step 954, the process transmits to the decoder the k-ith plane bits of the significance index list. The process then proceeds to step 956 where the threshold is updated by dividing the threshold by four. The process then proceeds to step 958 where the k-plane level is updated. The plane level is subtracted by two to form the new updated plane level. The process then proceeds to step 910 of FIG. 9b. As discussed above, if the bit budget is exceeded or k is less than zero the process ends. The process as described in connection with FIGS. 9A, 9B and 9C describe the encoder process utilized in connection with the present invention.

Referring to FIG. 10, more detailed discussion of the processes that occur in an encoder are illustrated. At step 1002, the magnitude of the coefficient is evaluated. If the magnitude of the coefficient is less than the threshold T, the process proceeds to step 1004 where the significance symbol is set to I. The process then proceeds to step 1022. If the magnitude of x is not less than the threshold T, the process proceeds to step 1006. At step 1006 the magnitude of x is evaluated to determine whether the magnitude is between T and 2 T. This step corresponds to evaluating the first of two planes. If at step 1006 the magnitude is between T and 2 T, the process proceeds to step 1008 where the significant symbol of the coefficient is set to S2. The process then proceeds to step 1010 where the indices of the coefficient is added to the new S2 indices list. The process then proceeds to step 1022. However, if at step 1006, the magnitude of x was not between T and 2 T, the process proceeds to step 1014. At step 1014, if the magnitude of x is between 2 T and 4 T, the process proceeds to step 1016 where the significant symbol is set to S1. The process then proceeds to step 1018. At step 1018 the indices of the coefficient x is added to the new S1 indices list. The process then proceeds to step 1022. However, if at step 1014, the magnitude of x is not between 2 T and 4 T, the process proceeds to step 1020 where the magnitude of x is greater than 4 T. The process then proceeds to step 1022 and a significant symbol is set to equal R. The process then proceeds to step 1022.

At step 1022, the process determines whether all descendants of the coefficient are insignificant. If all descendants are insignificant, the process proceeds to step 1024. At step 1024, the tree traversal/grouping symbol is set to "N". The process then proceeds to step 1026. At step 1026 the activity level of parent of x is checked. At step 1028, the last symbol for the coefficient is checked. The process then proceeds to Step 1030. At step 1030, the process selects the Huffman table based on the activity level and last symbol as determined at steps 1026 and 1028. At step 1031, the process transmits the significance traversal symbol. At step 1032, the last symbol is set to the significance symbol and traversal symbol as determined for the coefficient. The process then proceeds to step 1034. At step 1034, if the significance symbol is S1 or S2 the sign bit of the coefficient is transmitted to the decoder and the activity of x is set to "active". This ends the process under this branch.

If, however, at step 1022, if some descendants were significant, the process proceeds to step 1036. At step 1036, if a child is significant but no grandchildren are significant, the process proceeds to step 1038. At step 1038, the tree traversal symbol is set to G as discussed above in connection with FIG. 6. The process then proceeds to step 1040. At step 1040, the activity for the parent of coefficient x is checked. At step 1042, the activity level for the last symbol stored for the coefficient is determined. The process then proceeds to step 1044. At step 1044, the process selects the Huffman table based upon the last symbol and the activity of the parent of x. At step 1046, the last symbol is updated. The last symbol is set to the current significant symbol and traversal symbol determined for x as discussed in connection with FIG. 6a. The process then proceeds to step 1048. At step 1048, if the significance symbol is either S1 or S2, then the sign bit of the coefficient x is transmitted to the decoder and the activity for the coefficient x is set to "active". At step 1049, the significance/insignificance symbols of appropriate number of children (those which have not been discovered significant before) are combined to form the group symbol.

If at step 1036, however, the coefficient has significant grandchildren the process proceeds to step 1052. At step 1052 the tree traversal symbol is set to D as discussed in connection with FIG. 6a. The process then proceeds to step 1054 where the activity level for the coefficient x is determined. At step 1056 the activity level for parent of x is determined. The process then proceeds to step 1058 where a Huffman table is determined based upon the last symbol stored in the activity level for the coefficient x. The process then proceeds to step 1060. At step 1060, the last symbol is updated. The last symbol is set to equal the significant symbol and traversal symbol as determined for the coefficient x and as discussed in connection with FIG. 6a. The process then proceeds to step 1062. At step 1062, if the significance symbol is either S1 or S2, the sign bit for the coefficient is transmitted to the decoder and the activity of x is set to "active". The process then proceeds to step 1064. At step 1064 a recursive process is initiated that for each remaining child the tree is traversed as discussed from steps 1002–1064.

Figure 10A:
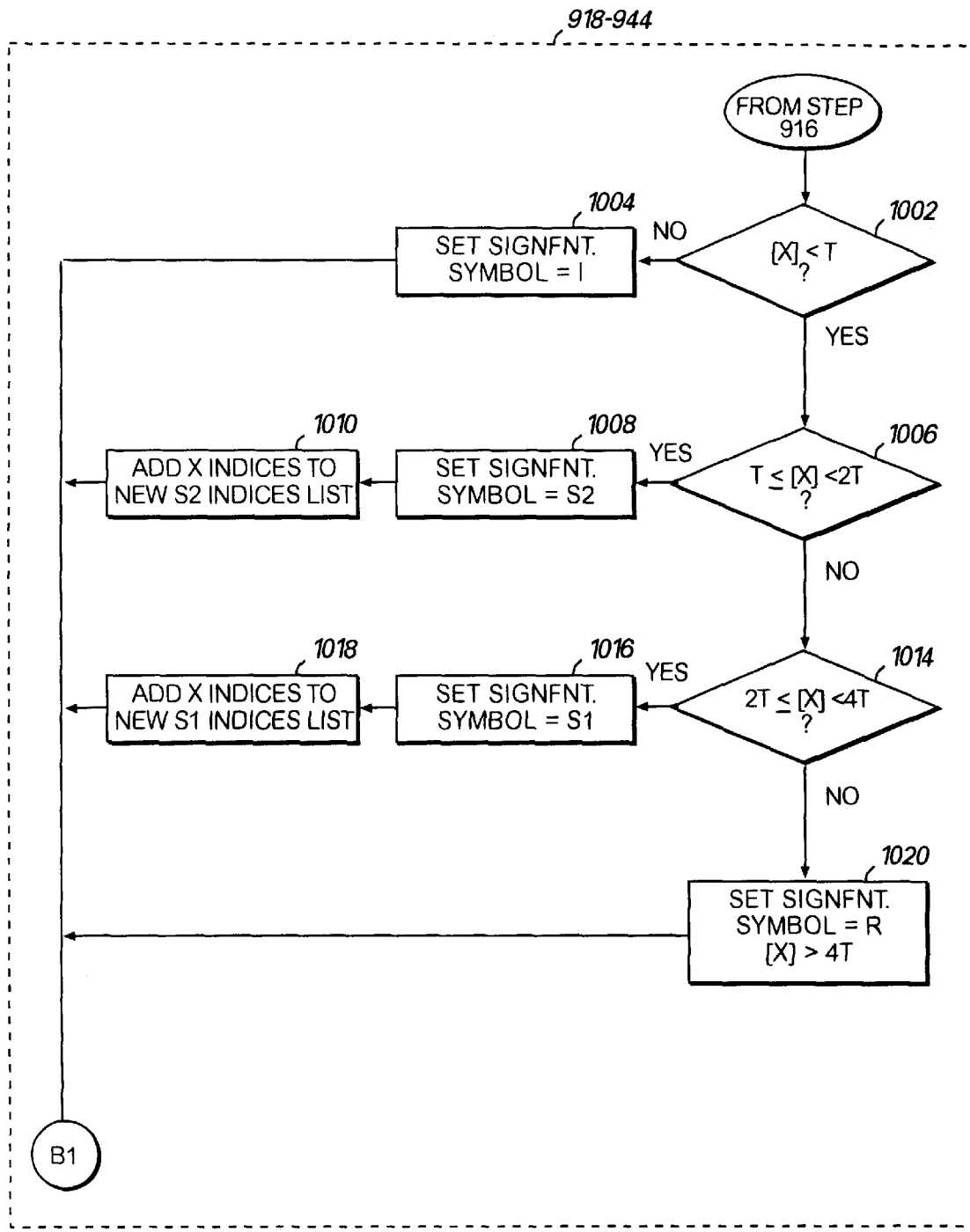
Figure 10B:
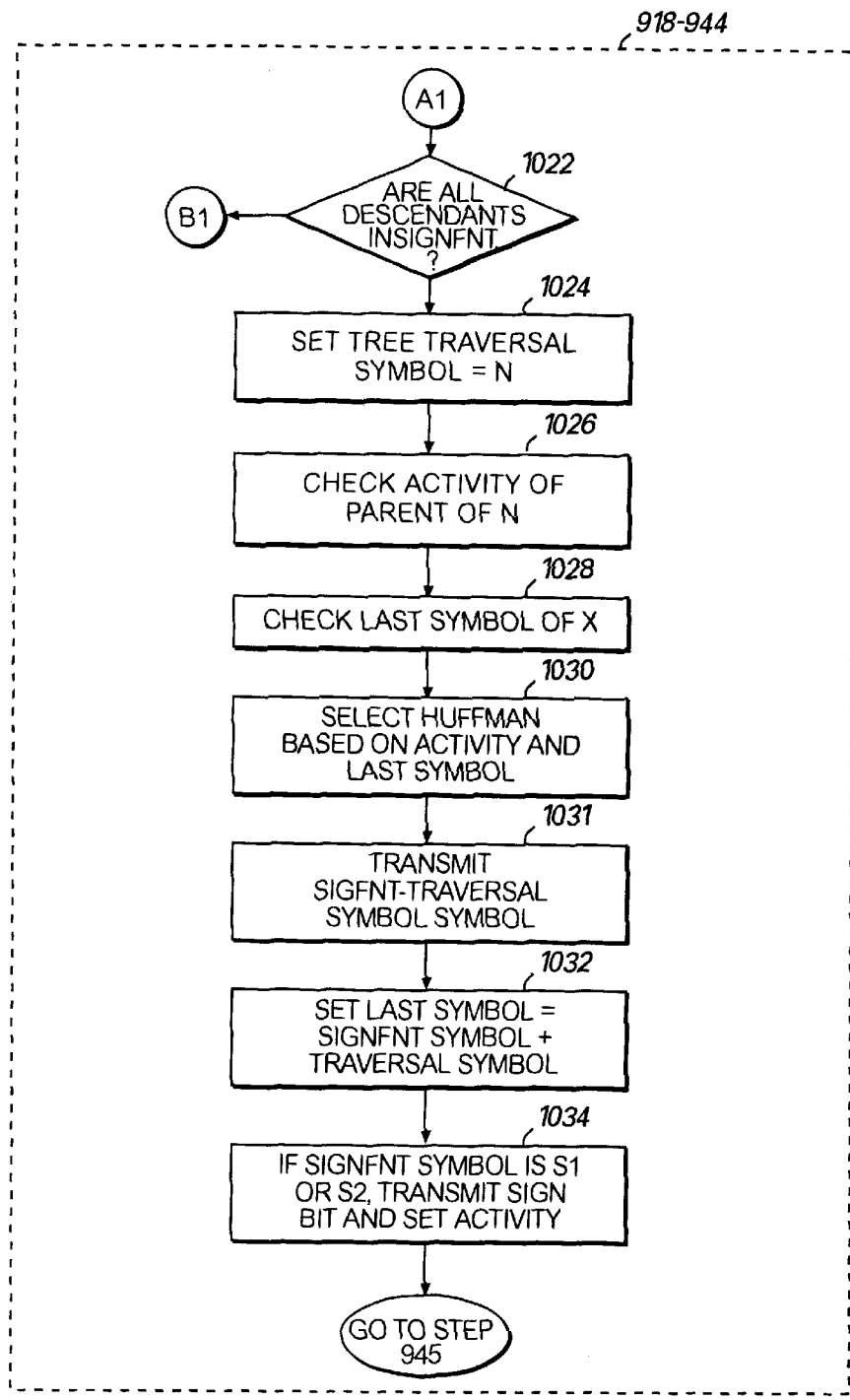
Figure 10C:
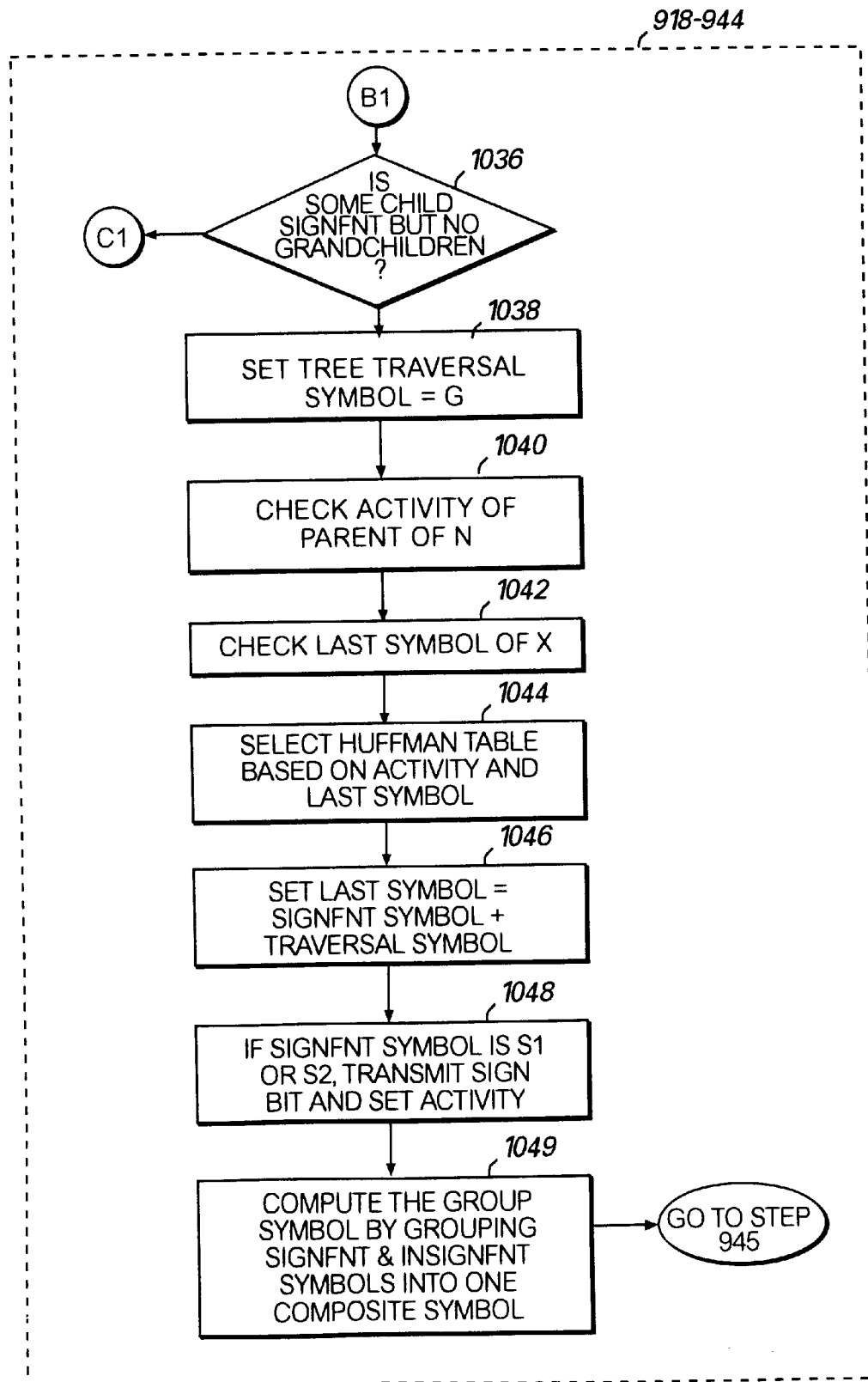
Figures 10D, 11A:
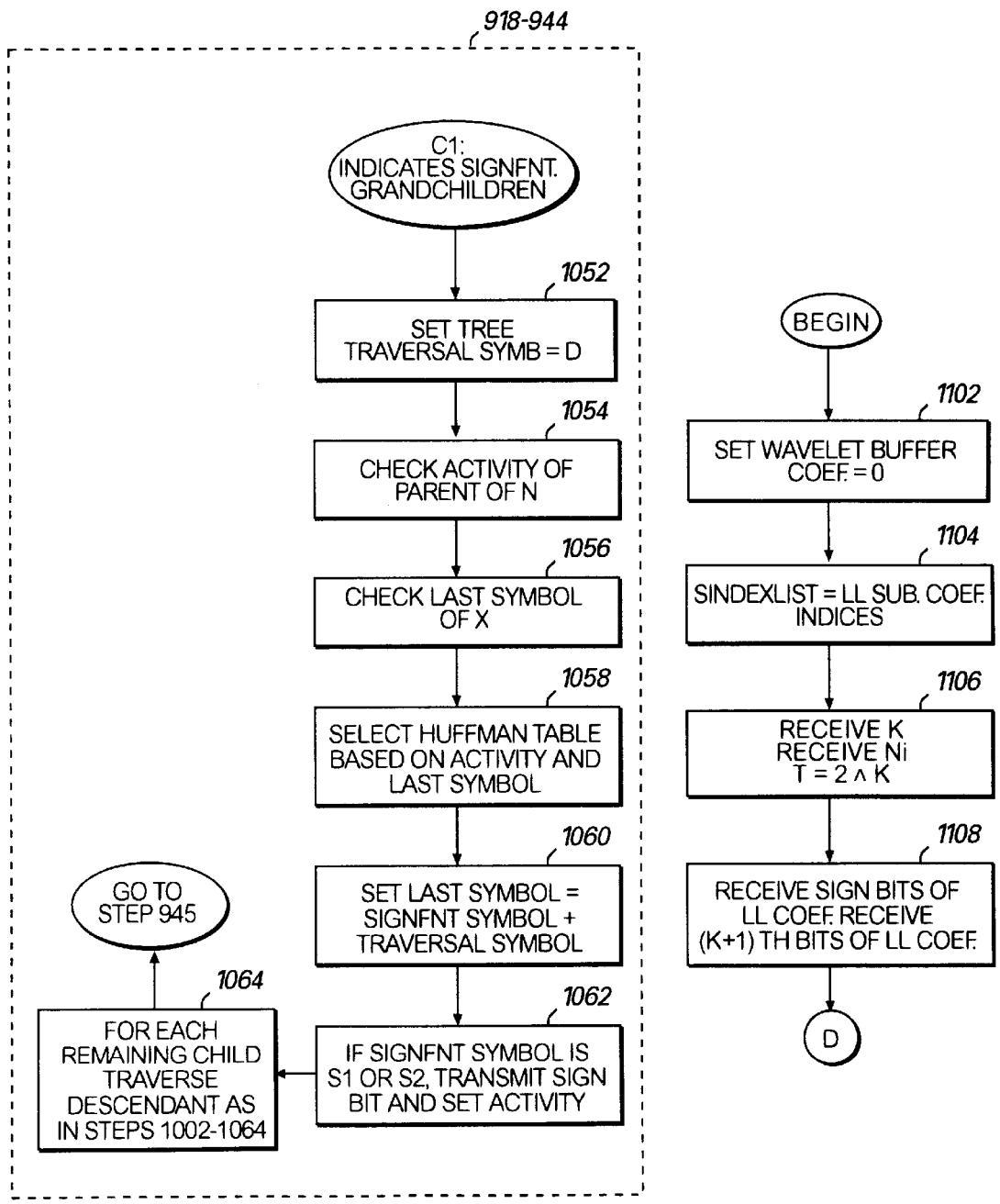
Figure 11B:
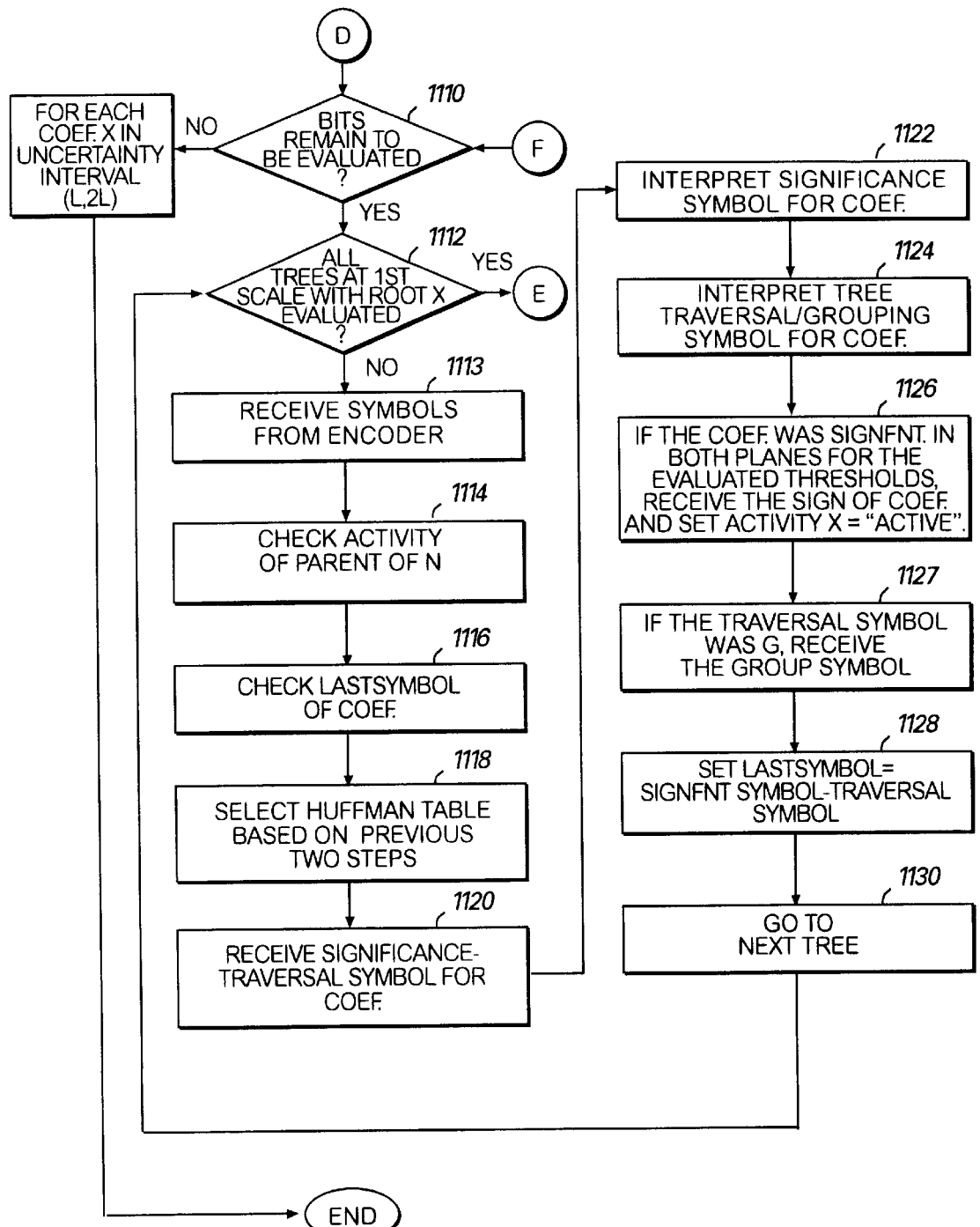
Figure 11C:
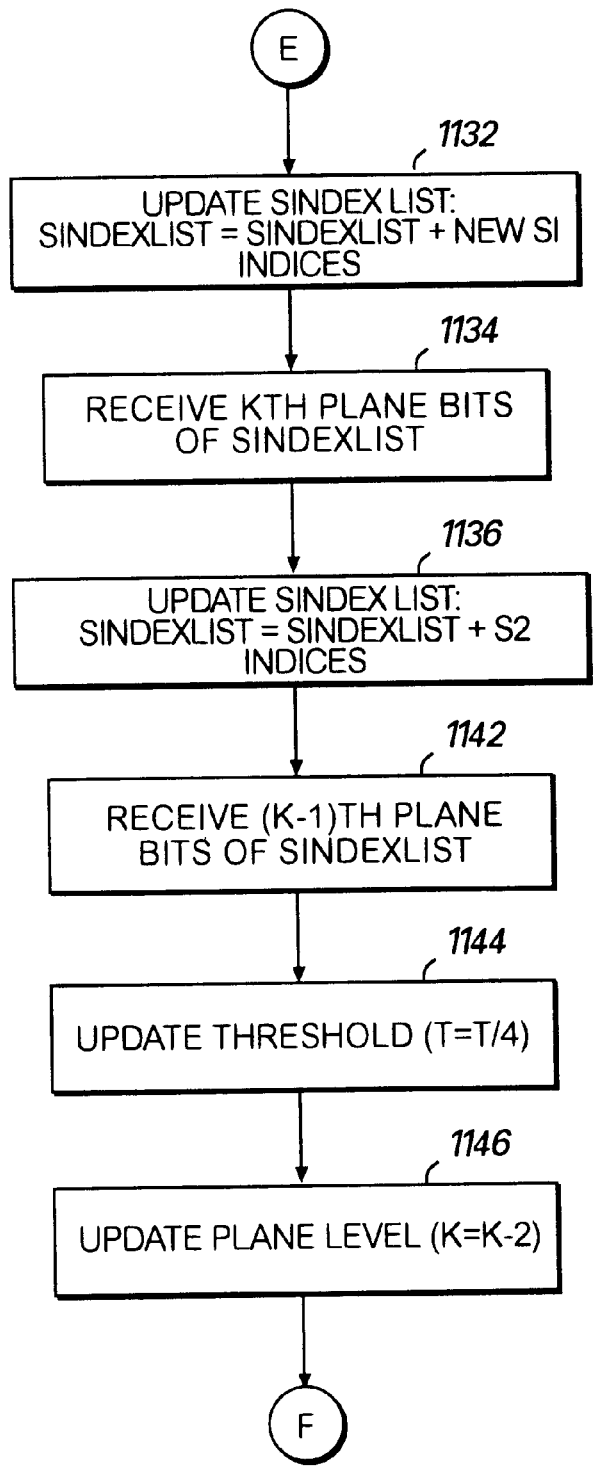
Figure 12A:
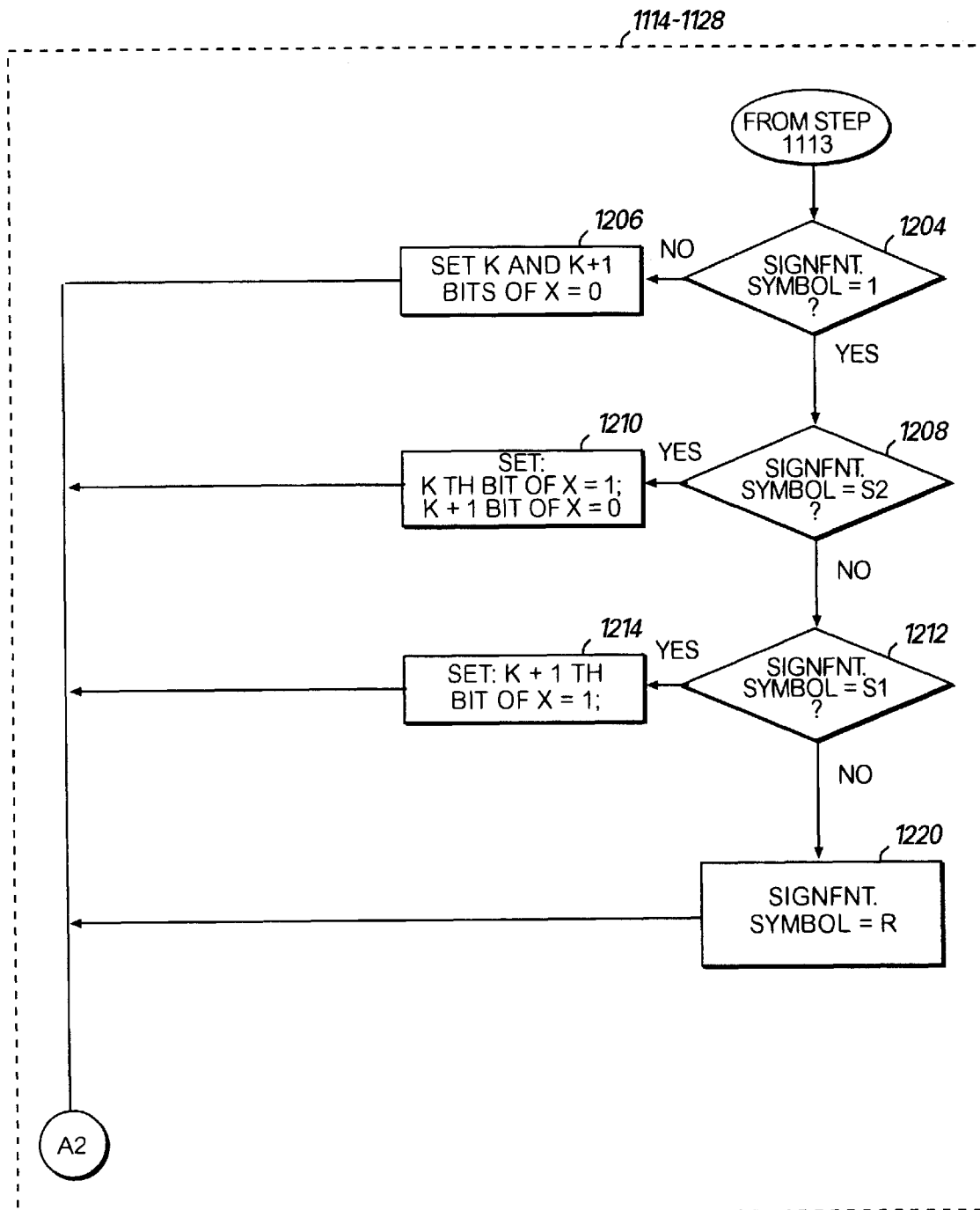
Figure 12B:
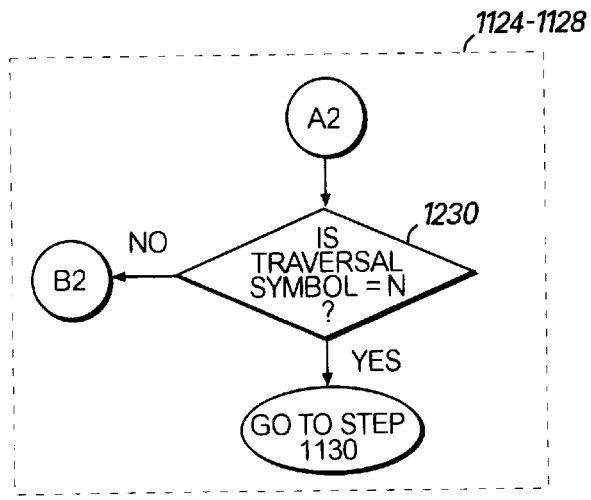
Figure 12C:
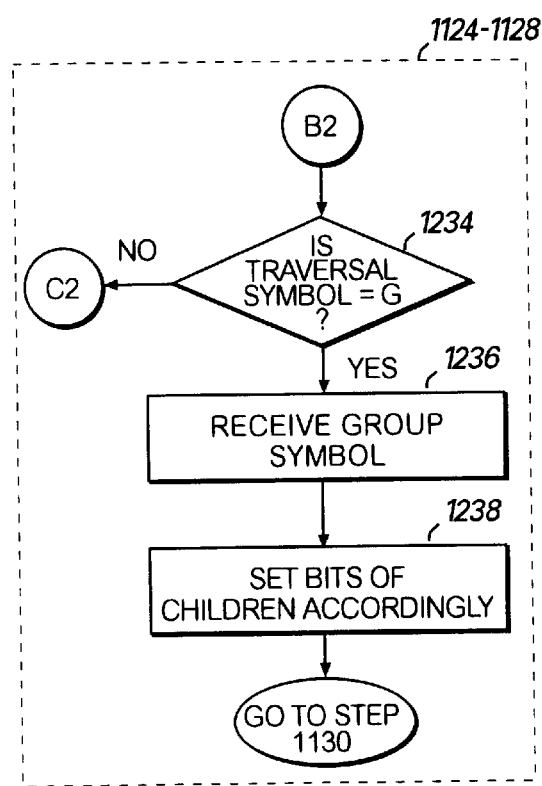
Figure 12D:
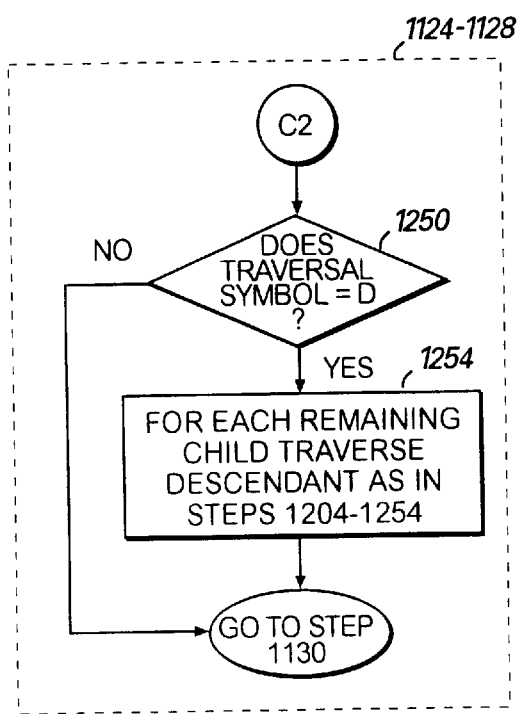

Referring to FIG. 11A, the initialization procedures for the decoder is discussed. At step 1102, all reconstructed discrete wavelet transform coefficients are initialized to zero. The process then proceeds to step 1104 where the initial condition of the significance list, S1 index list, is initialized with the LL subband coefficient indices. The process then proceeds to step 1106. At step 1106, the initial k-plane, number of iterations performed and the threshold value are received. At step 1108, the LL coefficient information is received including the sign bits of the LL coefficients and the "k+1"th bits of the LL coefficients. The process then proceeds to step 1110 of FIG. 11B.

At step 1110, the main iteration loop or the decoder 30 begins. At step 1110, the process determines whether bits remain to be evaluated. At step 1112, the process determines whether each tree at the first node with root x has been decided. At step 1113, the decoder receives the significance symbol transmitted by the encoder. At step 1114, the activity of the parent of the coefficient is checked. The process then proceeds to step 1116 where the last symbol of the coefficient is checked. The process then proceeds to step 1118. At step 1118, the process selects the appropriate Huffman table for decoding the symbol based upon the last symbol and the activity of the parent of the coefficient. The process then proceeds to step 1120. At step 1120 the significance, traversal symbol for the coefficient is received. The process then proceeds to step 1122. At step 1114, the significance symbols are interpreted. The process then proceeds to step 1124 where the traversal/grouping symbols are interpreted. At step 1126, if the coefficient was significant in either of the planes, then the sign of the coefficient is received and the activity is set forth to "active." At step 1127, if the traversal symbol was a group symbol, then the group symbol is received. The process then proceeds to step 1128. At step 1128, the last symbol is set to the last symbol received. The process proceeds to step 1130. At step 1130, the process proceeds to the next tree and back to step 1112. At step 1112, if all trees have been checked then the process proceeds to step 1132.

At step 1132, the significance index list is updated to include the new indices of the S1 coefficients. The process then proceeds to step 1134. At step 1134, the process receives the kth plane bit of the significant of the significance index list. The process then proceeds to step 1136. At step 1136, the significance index list is updated to include the indices of the S2 coefficients. The process then proceeds to step 1142 where the k-1th plane bits of the significance index list are received. At step 1144, the threshold is updated by dividing the threshold by four. The process then proceeds to step 1146. At step 1146, the k-plane level is updated by subtracting the k-plane level by two. The process then proceeds to step 1110, to determine whether bits remain to be received. If no bits remain to be received, then the process proceeds to step 1150, where the magnitude of each coefficient x in the uncertainty interval L is added to 0.5 multiplied by L. L is $2^k$ if k-th bit of the x is the last bit set for x. The decoding process then ends.

Referring to FIGS. 12a, 12b, 12c and 12d, a more detailed discussion of the processes occurring during the interpretation of the symbols is illustrated. At step 1204, if the significance symbol equals I, the process proceeds to step 1206 where the kth and the k+1th bits of x are set to zero. If, at step 1204, the significance symbol did not equal I, the process proceeds to step 1208. At step 1208, if the significance symbol equals S2, the process proceeds to step 1210 where the kth bit of x is set to 1 and the k+1th bit of x is set to zero. The process then proceeds to step 1230 of FIG. 12a.

If at step 1208 the significance symbol did not equal S2, the process proceeds to step 1212. At step 1212, if the significance symbol equals S1, the process proceeds to step 1214. At step 1214, the kth bit of x is set equal to 1. The process proceeds to step 1230. If, at step 1212, the significance symbol did not equal S2 and the significance symbol equals the refinement symbol R, indicated at step 1220, the process then proceeds to step 1230 of FIG. 12A. At step 1230, if all descendants are insignificant (i.e., the traversal symbol equals N) no further evaluation of the descendants is necessary. If, however, at step 1230 the coefficient has significant descendants, the process then proceeds to step 1234. If at step 1234 some child is significant but no grandchildren are significant, the process proceeds to step 1236. At step 1236, the group symbol for the coefficient is received. At step 1238, the bits of the children are set accordingly.

If at step 1234, no child was significant or there are significant grandchildren, then the process proceeds to step 1250. At step 1250, if the coefficient has significant grandchildren, the process proceeds to step 1254 where for each remaining grandchild, the descendants are traversed as in steps 1204 through 1254. The process then proceeds to step 1130. If at step 1250 there were no significant grandchildren, the process would proceed directly to step 1130, where the next tree is to be evaluated.

The encoding of wavelet coefficients on two bit planes simultaneously provides an improvement over one bit plane encoding as long as the iteration is not the final one. The improvement is realized because fewer I symbols are generated when two bit planes are evaluated at a single time. However, if the evaluation is the last iteration and the encoding stops toward the beginning of the iteration, the quality of the encoding would not be as good if the S2 coefficient is encoded instead of the more important S1 coefficient. The process may enable a user to set a condition to determine if the iteration is at the beginning of the last iteration. In such a case, the process encodes only S1 coefficients.

Huffman Tables Used

The full context for determining a Huffman table depends on a number of situations which could be:

(1) The color component (Y, U and V);

(2) The activity level of the parent;

(3) The last symbol of the coefficient;

(4) The bitplane encoding mode (whether it is two planes or one plane);

(5) Whether the coefficient is at the second bottommost level;

(6) What type of symbol it is: MSB, Refinement or Group.

The following is the list of a total of 21 tables used for Y component. The same number of tables are kept for U and V. In square brackets, the number of symbols in the table are given. Also, Last symbol="Else" means that no symbol has been generated for the coefficient in the previous iterations.

MSB Symbol Set 10 tables for coefficients which are at the subband level above the second bottommost level:

Activity level="active", Last symbol="I-N", Bit plane encoding mode="two planes", [9]

Activity level="active", Last symbol="I-N", Bit plane encoding mode="one plane", [6]

Activity level="inactive", Last symbol="I-N", Bit plane encoding mode="two planes", [9]

Activity level="inactive", Last symbol="I-N", Bit plane encoding mode="one plane", [6]

Last symbol="I-D" or "I-G", Bit plane encoding mode="two planes", [9]

Last symbol="I-D" or "I-G", Bit plane encoding mode="one plane", [6]

Activity level="active", Last symbol="Else", Bit plane encoding mode="two planes", [9]

Activity level="active", Last symbol="Else", Bit plane encoding mode="one plane", [6]

Activity level="inactive", Last symbol="Else", Bit plane encoding mode="two planes", [9]

Activity level="inactive", Last symbol="Else", Bit plane encoding mode="one planes", [6]

2 tables for coefficients at the second bottommost level:

Bitplane encoding mode="two planes", [6]

Bitplane encoding mode="one planes", [4]

Refinement Symbol Set 1 table for coefficients which are at subband level above the second bottommost level, [3]

1 table for coefficients at the second bottommost level, [2]

Group Symbols 7 tables depending on the number of coefficients not discovered previously:

Number of such coefficients=1, Bit plane encoding method="two planes", [2]

Number of such coefficients=2, Bit plane encoding method="two planes", [8]

Number of such coefficients=3, Bit plane encoding method="two planes", [26]

Number of such coefficients=4, Bit plane encoding method="two planes", [80]

Number of such coefficients=2, Bit plane encoding method="one plane", [3]

Number of such coefficients=3, Bit plane encoding method="one plane", [7]

Number of such coefficients=4, Bit plane encoding method="one plane", [15]

While the present invention has been illustrated by the description of the preferred and alternative embodiments and while the embodiments have been described in considerable detail, it is not the intention of the applicants to restrict or anyway limit the scope of the appended claims to such detail. Additional advantages and modifications will readily appear to those skilled in the art. The invention's broader aspects are therefore not limited to the specific details, represented apparatus and method, an illustrative example shown and described. Accordingly, departures may be made from such details without departing from the spirit or scope of applicant's general inventive concepts.

What is claimed is:

1. A method of coding a hierarchical subband system of coefficients of a wavelet transform that is representative of an image, said wavelet transform comprising coefficients organized in a plurality of frequency subbands representative of the decomposition of an image, each of said subbands representative of a different level of frequency detail of said image, said subbands having coefficients at a same orientation and having coefficients at a same spatial location as other of said subbands, said coefficients being operable for association among said coefficients by a tree structure, said tree structure relating a coefficient of a subband of a coarser level of detail to coefficients of a subband of a finer level of detail, a coefficient in a coarser subband being defined as a parent and coefficients corresponding to the same spatial location at the next finer scale from said coarse scale of similar orientation being children and the children of children being grandchildren and the set of coefficients, at a finer scale than a coarser scale, of similar orientation corresponding to the same spatial location within the subband being descendants, said method comprising the steps of:

receiving said coefficients of said wavelet transform;

selecting a first plurality of thresholds ranges;

comparing the coefficients of said tree structure against said plurality of threshold ranges during a first single traversal of said tree structure; and coding said coefficients of said tree structure with symbols based on whether said coefficients are or are not within at least one of said plurality of threshold ranges.

2. The method of claim 1 further comprising the step of utilizing Huffman tables to code said symbols.

3. The method of claim 1 wherein said step of selecting said plurality of threshold ranges comprises establishing an initial threshold value, T, from which said threshold ranges are selected.

4. The method of claim 3 wherein said step of selecting said plurality of threshold levels comprises selecting a first threshold level for coefficients that have a magnitude that is between T and 2 T and selecting a second threshold level for coefficients that have a magnitude that is between 2 T and 4 T.

5. The method of claim 1 wherein the step of coding said coefficients comprises coding a coefficient with a first symbol that indicates if said coefficient is located in a particular one of said ranges, coding said coefficient with a second symbol if said coefficient is in a second of said ranges, and coding said coefficient with a third symbol if said coefficient is not located within either of said first or said second of said ranges.

6. The method of claim 1 wherein said step of coding comprises coding a coefficient with a first symbol and a second symbol, said first symbol indicating whether or not said coefficient is within a particular range and coding said coefficient with a second symbol that indicates the path in which said tree should be traversed with respect to said coefficient.

7. The method of claim 1 further comprising:

comparing the coefficients of said tree structure against a second set of a plurality of threshold ranges during a second single traversal of said tree structure; and coding said coefficients during said second single traversal of tree structure based on symbols determined in said first single traversal of said tree structure.

8. A method of defining a set of symbols for coding a hierarchical subband system of coefficients of a wavelet transform that is representative of an image, said wavelet transform comprising coefficients organized in a plurality of frequency subbands representative of the decomposition of an image, each of said subbands representative of a different level of frequency detail of said image, said subbands having coefficients at a same orientation and having coefficients at a same spatial location as other of said subbands, said coefficients forming a tree structure, said tree structure relating a coefficient of a subband of a coarser level of detail to a subband of a finer level of detail, a coefficient in a coarser subband being defined as a parent and coefficients corresponding to the same spatial location at the next finer scale from said coarse scale of similar orientation being children and the descendants of children being grandchildren and the set of coefficients, at a finer scale than a coarser scale, of similar orientation corresponding to the same spatial location within the subband being descendants, said method comprising the steps of:

defining a first set of significance symbols that are representative of the significance of a coefficient with respect to a selected threshold, said first set of significance symbols operative for coding the significance of said coefficients with respect to said threshold; and defining a first set of tree structure traversal symbols that indicate the path in which said tree structure should be traversed and said tree structure traversal symbols being operative for combining with selected ones of said significance symbols.

9. The method of claim 8 wherein said step of defining said first set of significance symbols comprises defining a first significance symbol that indicates if said coefficient is located in a particular one of a plurality of threshold ranges, defining a second symbol that indicates if said coefficient is in a second of said plurality of threshold ranges, and defining a third symbol that indicates that a coefficient is not located within either of said first or said second of said ranges.

10. The method of claim 9 wherein said step of defining a first set of tree structure traversal symbols comprises defining a first traversal symbol that indicates that the descendants of a particular coefficient should be traversed in said tree structure and defining a second traversal symbol that indicates that the sibling of a particular coefficient should be traversed in said tree structure.

* * * * *